US010303628B2

(12) United States Patent
Chan et al.

(10) Patent No.: US 10,303,628 B2
(45) Date of Patent: May 28, 2019

(54) REORDERING RESPONSES IN A HIGH PERFORMANCE ON-CHIP NETWORK

(71) Applicant: Sonics, Inc., Milpitas, CA (US)

(72) Inventors: Jeremy Chan, San Jose, CA (US);
Drew E. Wingard, Palo Alto, CA (US);
Chien-Chun Chou, Saratoga, CA (US);
Hervé Jacques Alexanian, San Jose, CA (US); Kevin L. Daberkow, San Jose, CA (US); Harutyun Aslanyan, Yerevan (AM); Timothy A. Pontius, Crystal Lake, IL (US)

(73) Assignee: Sonics, Inc., Milpitas, CA (US)

( * ) Notice: Subject to any disclaimer, the term of this patent is extended or adjusted under 35 U.S.C. 154(b) by 711 days.

(21) Appl. No.: 14/976,620

(22) Filed: Dec. 21, 2015

(65) Prior Publication Data

US 2016/0188501 A1 Jun. 30, 2016

Related U.S. Application Data

(60) Provisional application No. 62/094,861, filed on Dec. 19, 2014.

(51) Int. Cl.
*G06F 13/00* (2006.01)
*G06F 13/16* (2006.01)
*G06F 13/40* (2006.01)

(52) U.S. Cl.
CPC ...... *G06F 13/1673* (2013.01); *G06F 13/4068* (2013.01)

(58) Field of Classification Search
CPC .......................... G06F 13/1673; G06F 13/4068
See application file for complete search history.

(56) References Cited

U.S. PATENT DOCUMENTS

2008/0301708 A1* 12/2008 Hamilton ............... G06F 9/466
719/314
2015/0296018 A1* 10/2015 Dondini .............. G06F 13/4022
709/213

* cited by examiner

*Primary Examiner* — Zachary K Huson
(74) *Attorney, Agent, or Firm* — Rutan & Tucker, LLP

(57) ABSTRACT

Flow logic supports concurrency of multiple threads and/or tag IDs to be concurrently communicated across the interconnect while allowing the one or more target IP cores to be able to reorder incoming request transactions from the initiator IP core in a manner that is optimal for that target IP core while relieving that target IP core from having to maintain the sequential issue order of transaction responses to the incoming request transactions in the thread or tags when processed by the target IP core. The flow logic cooperates with the reorder storage buffers to control an operation of the reorder storage buffers as well as control issuance of at least the request transactions from the initiator IP core onto the interconnect in order to maintain proper sequential ordering of the transaction responses for the thread or tags when the transaction responses are returned back to the initiator IP core.

18 Claims, 11 Drawing Sheets

Example showing reorder network next to data network

Figure 3: Example showing reorder network next to data network

Figure 4: Example block diagram of initiator agent

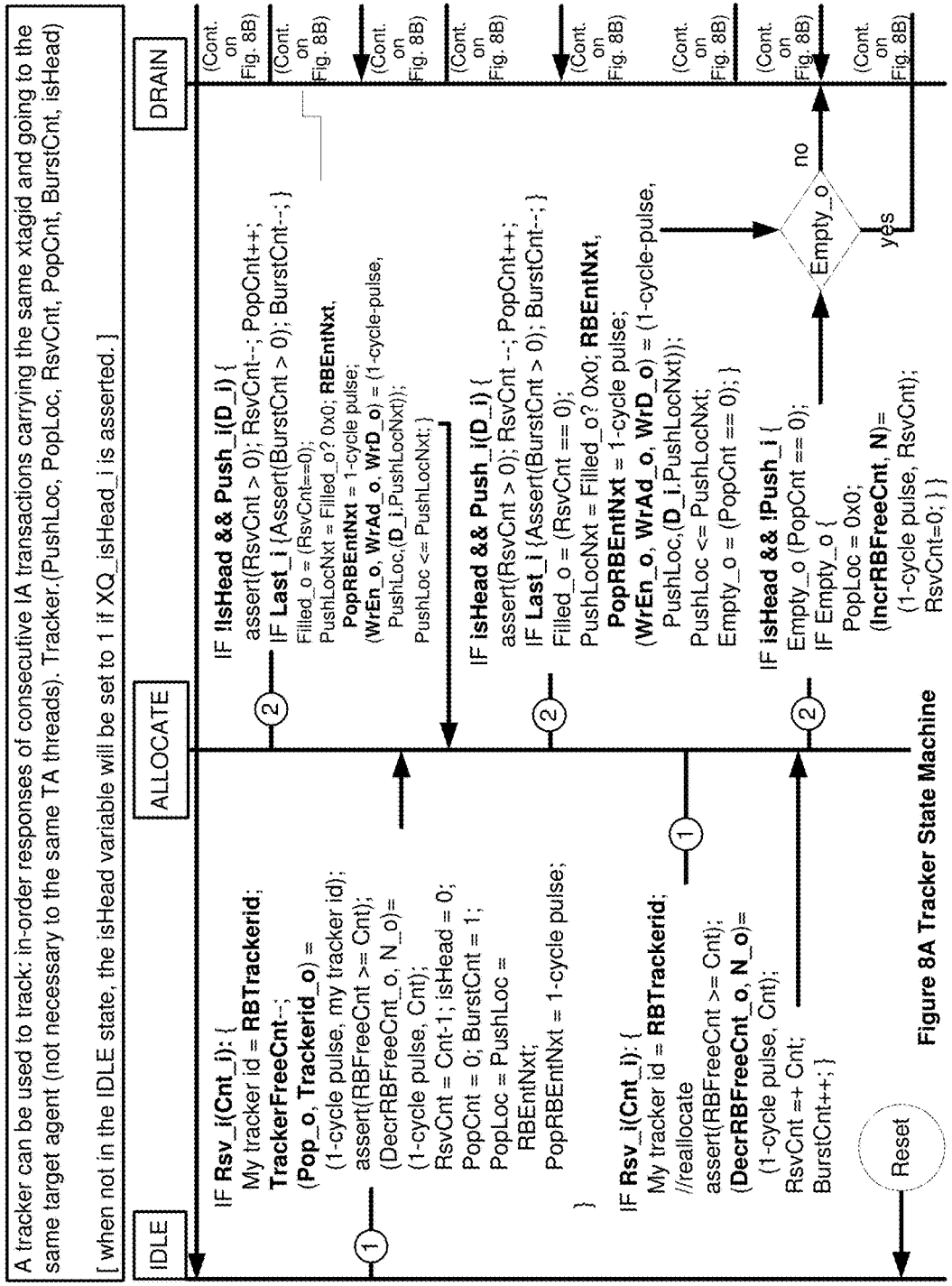
Figure 8A Tracker State Machine

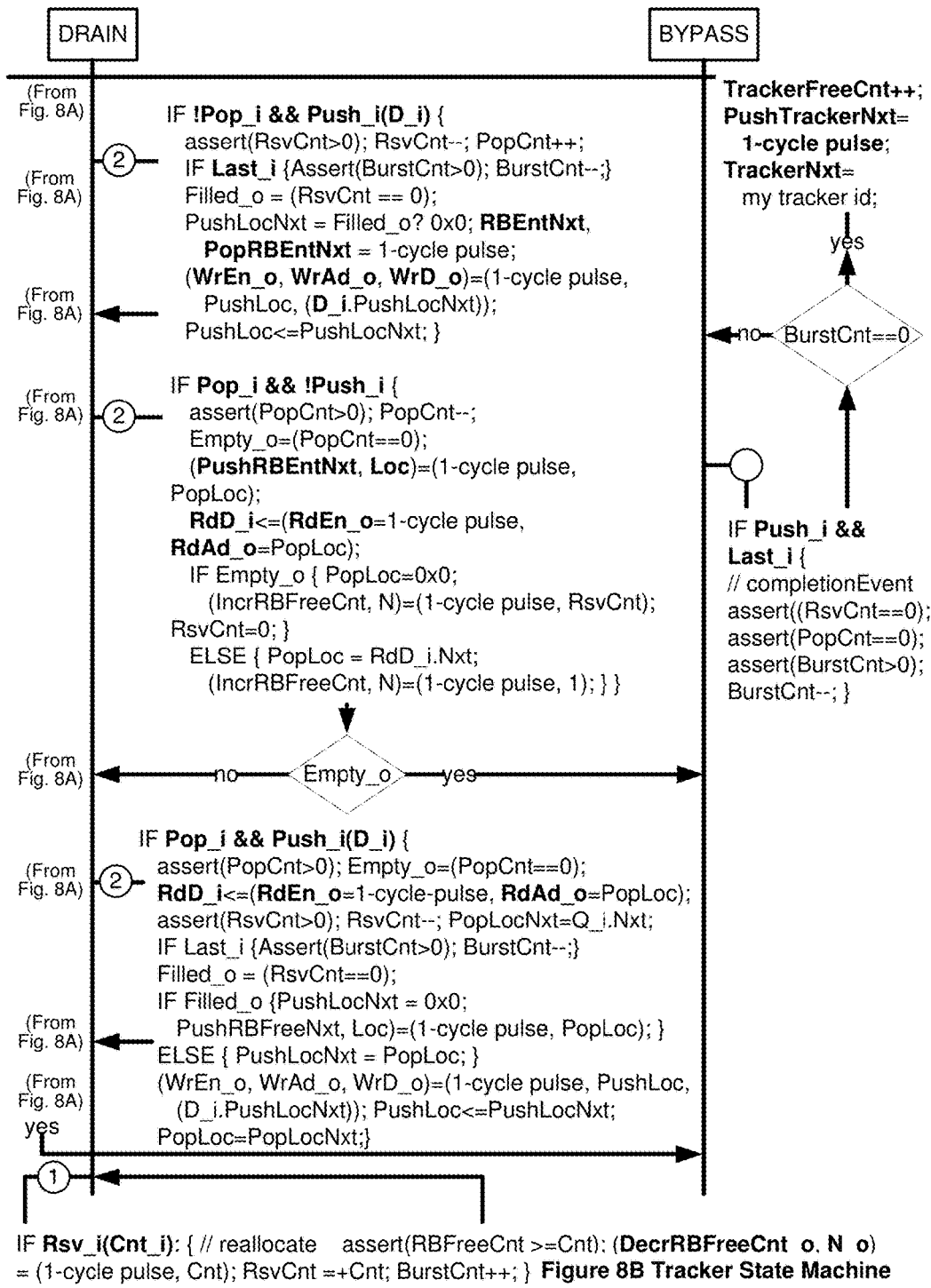
Figure 8B Tracker State Machine

REORDERING RESPONSES IN A HIGH PERFORMANCE ON-CHIP NETWORK

RELATED APPLICATIONS

This application claims the benefit under 35 U.S.C. 119(e) of U.S. Provisional Patent Application Ser. No. 61/094,861, filed Dec. 19, 2014, entitled "Reordering responses in a high performance on-chip network," which is also incorporated herein by reference.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD

In general, an embodiment relates to reordering transaction responses in a chip.

BACKGROUND

Space and power is limited on a chip.

SUMMARY

Various methods and apparatuses are described for flow logic a set of reorder buffers on a System-on-a-Chip.

In an embodiment, the flow logic determines how the interconnect routes transactions between the initiator ports and the target ports. The interconnect includes initiator agents coupled to the initiator ports to receive transaction requests from the initiator IP cores and target agents coupled to the target ports to send transaction requests to the target IP cores. At least one of the initiator agents includes a reorder storage buffer, where the flow logic is configured to allocate storage entries in the reorder storage buffer.

The flow logic is also configured to identify which transactions require storage entries in the reorder storage buffer such that: (i) transaction requests with response ordering dependencies can be sent from the initiator agent to different target ports, such that the transaction requests are concurrently pending, (ii) responses to the transaction requests can be sent by the different target ports in an order that does not match response ordering dependencies required by the transaction requests received from a first initiator IP core, (iii) the reorder storage buffer stores the responses that do not match the ordering dependencies without preventing the interconnect from delivering any target agent responses, and (iv) the flow logic identifies which transactions require storage entries in the reorder storage buffer operates so as to permit more transaction responses to be pending than can be stored in the reorder storage buffer.

In an embodiment, the flow logic cooperates with a set of reorder buffers enables efficient transmission of information through a communication interconnect/Network on a Chip. One or more target IP cores may include at least one multi-channel target IP core. Two or more memory channels that have physically different system addresses make up a first multi-channel target of the target IP cores. A first set of memory channels may have a first target agent, and a second set of memory channels of that multi-channel target IP core may have a second target agent. The two or more memory channels populate an address space assigned to the multi-channel target IP core and appear as a single logical target IP core to the initiator IP cores. The Network on a Chip/interconnect is configured to route information between the master/initiator IP cores and the slave/target IP cores in the System on the Chip. Two or more reorder storage buffers are optimally distributed with storage components in both i) in one or more initiator agents/sockets, where specific concurrency needs are known, and ii) in one or more target agents/sockets, where latencies are known. Distributed reorder storage buffers populate on the chip either by i) selectable parameters in a configurable programmable register, in a run time implementation or ii) software-writable, selectable parameters in a design time implementation selected by a chip's designer. These parameters support an amount, a storage capacity, and a geographic distribution of the reorder storage buffers in the initiator agents/sockets and in the target agents/sockets. The selected parameters by the chip's designer optimize that instance of the System on the Chip's implementation. Thus, a second instance of the System on the Chip may be configured to have a different amount, storage capacity, and geographic distribution of the reorder storage buffers from the first instance based on the selectable parameters chosen by the chip's designer. A sequential order exists in an issued request transactions making up either i) a thread or ii) a set of tags with the same tag ID issued coming from a given initiator IP core. The interconnect has flow logic configured to support concurrency of multiple different threads and/or multiple sets of tags with different tag IDs to be concurrently communicated across the interconnect, where the flow logic also allows the one or more target IP cores to be able to reorder incoming request transactions from the first initiator IP core in a manner that is optimal for that target IP core. The flow logic relieves that target IP core from having to maintain the sequential issue order of transaction responses to the incoming request transactions in the thread or the set of tags with the same tag IDs while that target IP core processes those incoming request transactions within the target IP core. The flow logic is configured to cooperate with the reorder storage buffers to control an operation of the reorder storage buffers as well as control issuance of at least the request transactions from the initiator IP core onto the interconnect in order to maintain proper sequential ordering of the transaction responses for the thread or the set of tags with the same tag IDs when the transaction responses are returned back to the initiator IP core.

BRIEF DESCRIPTION OF THE DRAWINGS

The multiple drawings refer to the embodiments of the design.

FIGS. 8A and 8B illustrate an example tracker state machine for the Reorder Buffer, where a tracker state machine is i) for a reorder buffer in the initiator agent or ii) for a cooperating pair of reorder buffers that geographically have portions located in both the initiator agent and the target agent, where tracker state machine is configured to track a set of related transaction dependencies for transactions of the thread or set of tags that are capable of being reordered.

Figure 1A:
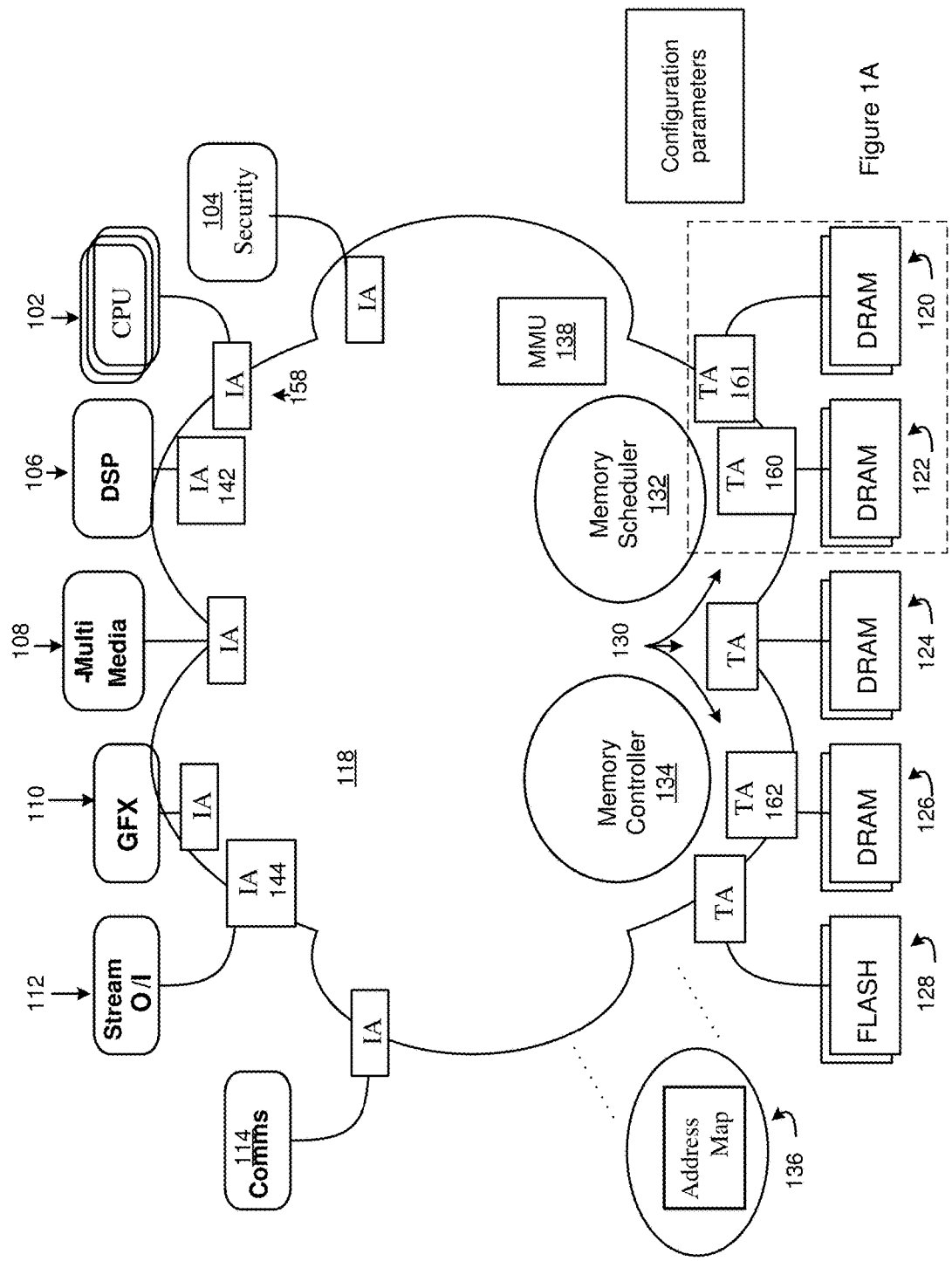
FIG. 1A illustrates a block diagram of an embodiment of a System-on-a-Chip, where the one or more target IP cores include at least one multi-channel target IP core with two or more reorder storage buffers that are optimally distributed with storage components in both i) in one or more initiator agents/sockets and in one or more target agents/sockets.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific routines, named components, connections, types of IP cores, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details may be varied from and still be contemplated to be within the spirit and scope of the present design.

Multiple example processes of and apparatuses to provide reordering responses in a high performance on-chip network are described. Various methods and apparatuses associated with routing information from master/initiator cores (ICs) to slave target cores (TCs) through one or more routers in a System on a Chip (SoC) interconnect that takes into consideration the disparate nature and configurability of the ICs and TCs are disclosed. The design utilizes optimally distributed storage configured between both i) initiator agents, where specific concurrency needs are known, and ii) target agents, where latencies are known, where the amount and distribution of reorder storage buffers can be selected by the chip's designer to be optimized for their chip's implementation. The methods and apparatus enable efficient transmission of information through the Network on a Chip/interconnect.

The flow logic supports concurrency of multiple different threads and/or multiple sets of tags with different tag IDs to be concurrently communicated across the interconnect. The flow logic also allows the one or more target IP cores to be able to reorder incoming request transactions from the initiator IP core in a manner that is optimal for that target IP core while relieving that target IP core from having to maintain the sequential issue order of transaction responses to the incoming request transactions in a thread or a set of tags with the same tag IDs while that target IP core processes those incoming request transactions within the target IP core. The flow logic is also configured to cooperate with the reorder storage buffers to control an operation of the reorder storage buffers as well as control issuance of at least the request transactions from the initiator IP core onto the interconnect in order to maintain proper sequential ordering of the transaction responses for the thread or the set of tags with the same tag IDs when the transaction responses are returned back to the initiator IP core.

The design provides an interconnect, for a System-on-a-Chip, with optimally distributed storage configured between both i) initiators and ii) targets, where the amount and distribution of reorder storage buffers can be selected by the chip's designer to be optimized for their chip's implementation. The design further includes one or more state machines and a target control network "release" path. The design further includes bypassable buffers as well as scalability in the design's IP Cores and Fabric FIG. 1A illustrates a block diagram of an embodiment of a System-on-a-Chip, where the one or more target IP cores include at least one multi-channel target with two or more reorder storage buffers that are optimally distributed with storage components in both i) one or more initiator agents/sockets and ii) one or more target agents/sockets. Chip 100 includes multiple initiator IP cores (IC) and multiple target IP cores (TC) that communicate read and write requests as well as responses to those requests over a network on the chip/interconnect fabric 118. The fabric 118 may also be referred to as a packet-based switch network because the data transferred within the fabric is in the form of packets. Some examples of an IC may include one or more CPU IP cores 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

In general, in an interconnection communication network, there are a number of heterogeneous initiator agents (IAs) and target agents (TAs) and routers. The transactions, in formats such as packets, travel from the IAs to the TAs in a request network and from the TAs to the IAs in a response network.

Each IC may have its own initiator agent (IA) (e.g., IA 142, IA 144, etc.) to interface with the fabric 118. Some examples of a TC may include DRAM IP core 120 through DRAM IP core 126 and FLASH memory IP core 128. Each TC may have its own target agent (TA) (e.g., TA 160, TA 162) to interface with the fabric 118. Each of the DRAM IP cores 120-126 may have an associated memory controller. Similarly, the flash memory 128 is associated with a flash controller. All of the ICs 102-114 and TCs 120-128 may operate at different performance rates (i.e. peak bandwidth, which can be calculated as the clock frequency times the number of data bit lines (also known as data width), and sustained bandwidth, which represents a required or intended performance level). The fabric 118 may be part of an integrated circuit, such as System-on a Chip (SoC).

The interconnect includes initiator agents coupled to the initiator ports to receive transaction requests from the initiator IP cores and target agents coupled to the target ports to send transaction requests to the target IP cores. In an embodiment, the flow logic determines how the interconnect routes transactions between the initiator ports and the target ports. At least one of the initiator agents, and possibly all of the agents, includes a reorder storage buffer. The flow logic is configured to allocate storage entries in the reorder storage buffer.

The flow logic is also configured to identify which transactions require storage entries in the reorder storage buffer such that: (i) transaction requests with response ordering dependencies can be sent from the initiator agent to different target ports, such that the transaction requests are concurrently pending, (ii) responses to the transaction requests can be sent by the different target ports in an order that does not match response ordering dependencies required by the transaction requests received from a first initiator IP core, (iii) the reorder storage buffer stores the responses that do not match the ordering dependencies without preventing the interconnect from delivering any target agent responses, and (iv) the flow logic identifies which transactions require storage entries in the reorder storage buffer operates so as to permit more transaction responses to be pending than can be stored in the reorder storage buffer. This both ensures high performance by avoiding flow control and avoids potential deadlocks.

The flow logic is generally dispersed among multiple discrete blocks of logic and functionality, such as the state machines, map, etc. The flow logic may relate to address, ordering (e.g. OCP tag) identifier, transaction number (e.g. every other transaction goes to the even or odd port for load balancing), transaction attribute (e.g. priority), etc.

One or more target IP cores may include at least one multi-channel target IP core such as a first multiple channel target IP core consisting of DRAMs 120 and 122. Two or more memory channels that have physically different system addresses make up a first multi-channel target of the target IP cores. A first set of memory channels may have a first target agent 160, and a second set of memory channels may have a second target agent 161. The two or more memory channels populate an address space assigned to the first multi-channel target and appear as a single logical target IP core to the initiator IP cores. The distribution of reorder buffers, based on the selectable parameters chosen by the chip's designer, has i) one or more of the reorder buffers that store the transaction responses for the thread or the set of tags with the same tag ID and are geographically located in an initiator agent, such as IA 142, coupled to the initiator IP core and ii) one or more of the reorder buffers that store the transaction responses for the thread or the set of tags with the same tag ID and can be geographically located in at least a first target agent and a second target agent of the multi-channel target agent.

The flow logic cooperating with the reorder buffers also covers systems where the same target IP core (memory) is accessed through two or more ports on the interconnect. The flow control reorder buffers may cooperate with the flow logic on routing decision about which port to use while relieving the target IP core from having to maintain issue order of the thread.

The flow logic is configured to monitor availability in the storage capacity in both the reorder buffers in the first target agent, the second target agent, and the initiator agent to control the issuance of the request transactions from the initiator IP core onto the interconnect as well as control issuance of the transaction responses onto the interconnect; and thus, the reorder buffers are split across both the initiator agent for the initiator IP core, as well as the first target agent and the second target agent for the multi-channel target IP core and a specific portion of the distributed reorder buffers that is configured in each location is set by the selectable parameters chosen by the chip's designer.

The amount of reorder buffers, the storage capacity of reorder buffers, a maximum number of outstanding transactions allowed are configured on a per-agent basis based on the selectable parameters chosen by the chip's designer. Thus, a first initiator agent may have a different amount of reorder buffers with a storage capacity for the reorder buffers and a different amount of maximum number of outstanding transactions allowed than a second initiator agent coupled to the interconnect.

Routing Network

Figure 1B:
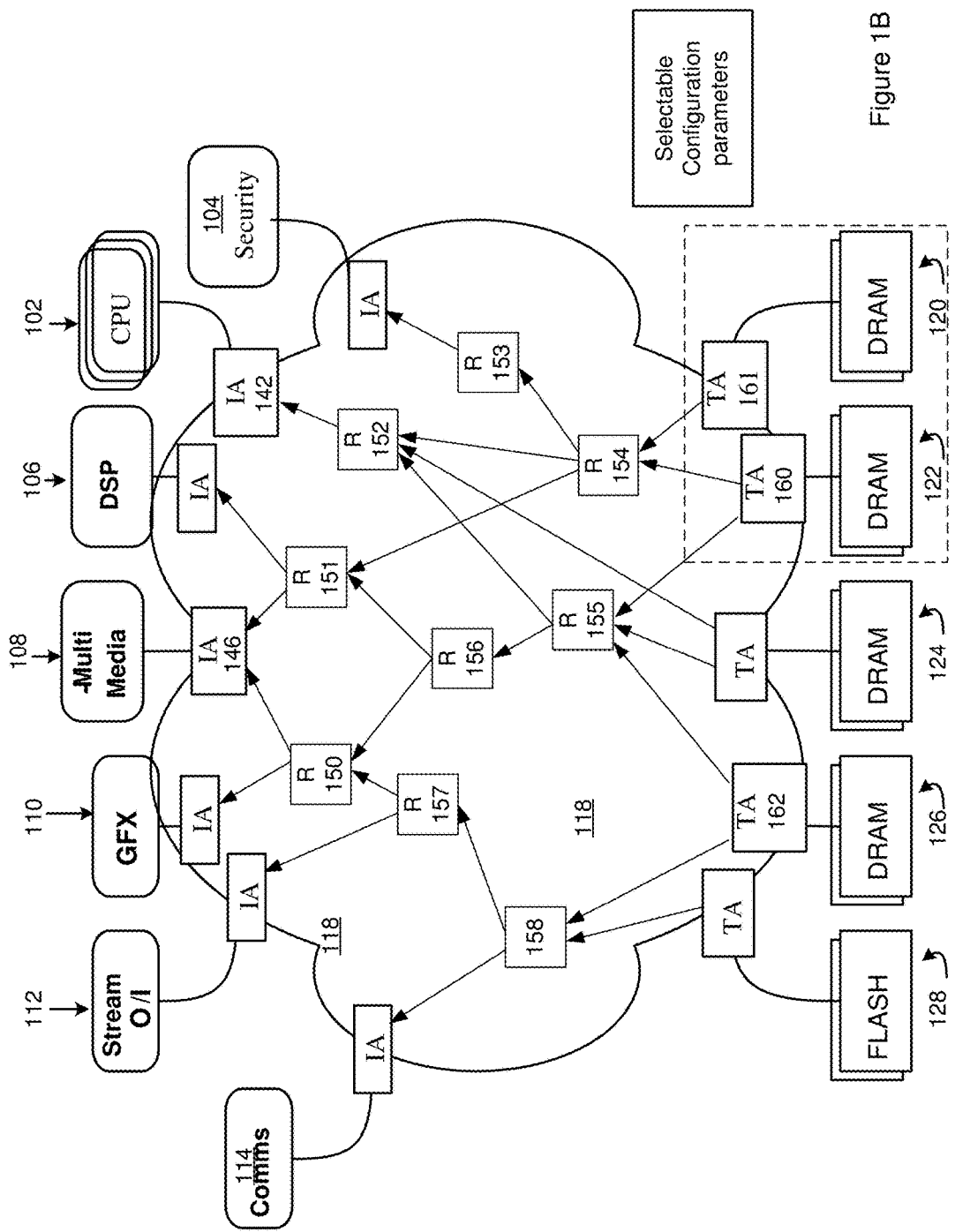
FIG. 1B illustrates a block diagram of an embodiment of instance of the System on the Chip with a reorder buffer distribution determined by either i) selectable parameters in a configurable programmable register, in a run time implementation or ii) software-writable, selectable parameters in a design time implementation that are configured to support an amount, a storage capacity, and a geographic distribution of the reorder storage buffers in the initiator agents/sockets and in the target agents/sockets.

FIG. 1B illustrates a block diagram of an embodiment of instance of the System on the Chip with a reorder buffer distribution determined by either i) selectable parameters in a configurable programmable register, in a run time implementation or ii) software-writable, selectable parameters in a design time implementation that are configured to support an amount, a storage capacity, and a geographic distribution of the reorder storage buffers in the initiator agents/sockets and in the target agents/sockets. Either i) selectable parameters in a configurable programmable register, in a run time implementation or ii) software-writable, selectable parameters in a design time implementation are configured to support an amount, a storage capacity, and a geographic distribution of the reorder storage buffers in the initiator agents/sockets and in the target agents/sockets to be the selectable parameters by a chip's designer in order to optimize a different instances of the System on the Chip's implementation. The amount may be an amount of reorder buffers and/or an amount of transactions outstanding.

The interconnect/on-chip network, for the System-on-a-Chip, has multiple routers and then internal paths with serial or parallel routing line/paths between the different routers. FIG. 1B is similar to the FIG. 1A but with the addition of the routers in the interconnect fabric 118, and potentially a different distribution of reorder buffers in the agents/sockets. FIG. 1B illustrates a response network where the information flows to the ICs and IAs from the target agents and TCs. Although not illustrated, there is a corresponding, not necessarily mirrored, response network that connects the TCs and the target agents to the IAs and ICs and routes transactions accordingly. The routers may be used to route packets within the fabric 118 from a source location (e.g., the ICs 102-114) to a destination location (e.g., the TCs 120-128) in the integrated circuit. There may be multiple routers in the fabric 118. The number of routers may be implementation specific (e.g., topology used, area requirement, latency requirement, etc.). The data sent from the IC 102 to the TC 122 may be packetized by packetizing logic associated with the initiator agent 142 before being sent into the fabric 118. Again, the transactions may be formatted in a packet format or some other format. The packets may pass through the routers 150 through 158. The packets may then be depacketized by depacketizing logic associated with target agent 160 when they leave the fabric 118. Similarly, the data associated with responses sent from the TC 126 to the IC 108 may be packetized by packetizing logic associated with the target agent 162 before being sent into the response fabric 118. These packets may pass through the routers 151, 155, & 156. These packets may then be depacketized by depacketizing logic associated with the initiator agent 146 when they leave the response fabric 118. Likewise, illustrated in FIG. 1B is the data flowing from target agent 160 to the router 155 to the router 156 to the router 150 to IA 146 of the IC 108, where each individual link/routing path between these components may have transactions passed between the links.

Two or more reorder storage buffers are optimally distributed with storage components in both i) in one or more initiator agents/sockets, where specific concurrency needs are known, and ii) in one or more target agents/sockets, where latencies are known.

Distributed reorder storage buffers populate on the chip either by i) selectable parameters in a configurable programmable register, in a run time implementation or ii) software-writable, selectable parameters in a design time implementation selected by a chip's designer. These parameters support an amount, a storage capacity, and a geographic distribution of the reorder storage buffers in the initiator agents/sockets and in the target agents/sockets. The selected parameters by the chip's designer optimize that instance of the System on the Chip's implementation. Thus, a second instance of the System on the Chip may be configured to have a different amount, storage capacity, and geographic distribution of the reorder storage buffers from the first instance based on the selectable parameters chosen by the chip's designer.

The interconnect/on-chip network has flow logic configured to support concurrency of multiple different threads and/or multiple sets of tags with different tag IDs to be concurrently communicated across the interconnect. The flow logic also allows the one or more target IP cores to be able to reorder incoming request transactions from the first initiator IP core in a manner that is optimal for that target IP core while relieving that target IP core from having to maintain the sequential issue order of transaction responses to the incoming request transactions in a first thread or a first set of tags with the same tag IDs while that target IP core processes those incoming request transactions within the target IP core. The flow logic is also configured to cooperate with the reorder storage buffers to control an operation of the reorder storage buffers as well as control issuance of at least the request transactions from the first initiator IP core onto the interconnect in order to maintain proper sequential ordering of the transaction responses for the first thread or the first set of tags with the same tag IDs when the transaction responses are returned back to the first initiator IP core.

Each initiator agent may contain flow logic configured to send transaction requests with response ordering requirements to different target ports, such that the transaction requests are concurrently pending after the initiator agent reorder storage buffer has insufficient entries to store the associated responses. The target agents, coupled to the different target ports, include their own target reorder storage buffer. The flow logic allocates storage entries in the reorder storage buffers. The flow logic identifies which target port responses can be safely, from an ordering dependency perspective, sent to the first initiator agent and then release those identified responses onto the interconnect.

The interconnect may include a reorder control path to communicate flow control information from the first initiator agent to the target agents coupled to the different target ports indicating that it is safe to send a specific identified set of responses for that target port to the initiator agent. The flow logic may forward target port responses without going through a first reorder storage buffer located in a first target agent, when the flow control information arrives at the first target agent before the response.

FIGS. 2-9, as discussed below, illustrate aspects of an embodiment of the agents and interconnect for a System-on-a-Chip, with optimally distributed storage configured between both i) initiators and ii) targets. The amount and distribution of reorder storage buffers can be selected by the chip's designer to be optimized for their chip's implementation. The figures further show one or more state machines and a target control network release control path. The figures further show bypassable buffers as well as scalability in the design.

Figure 2:
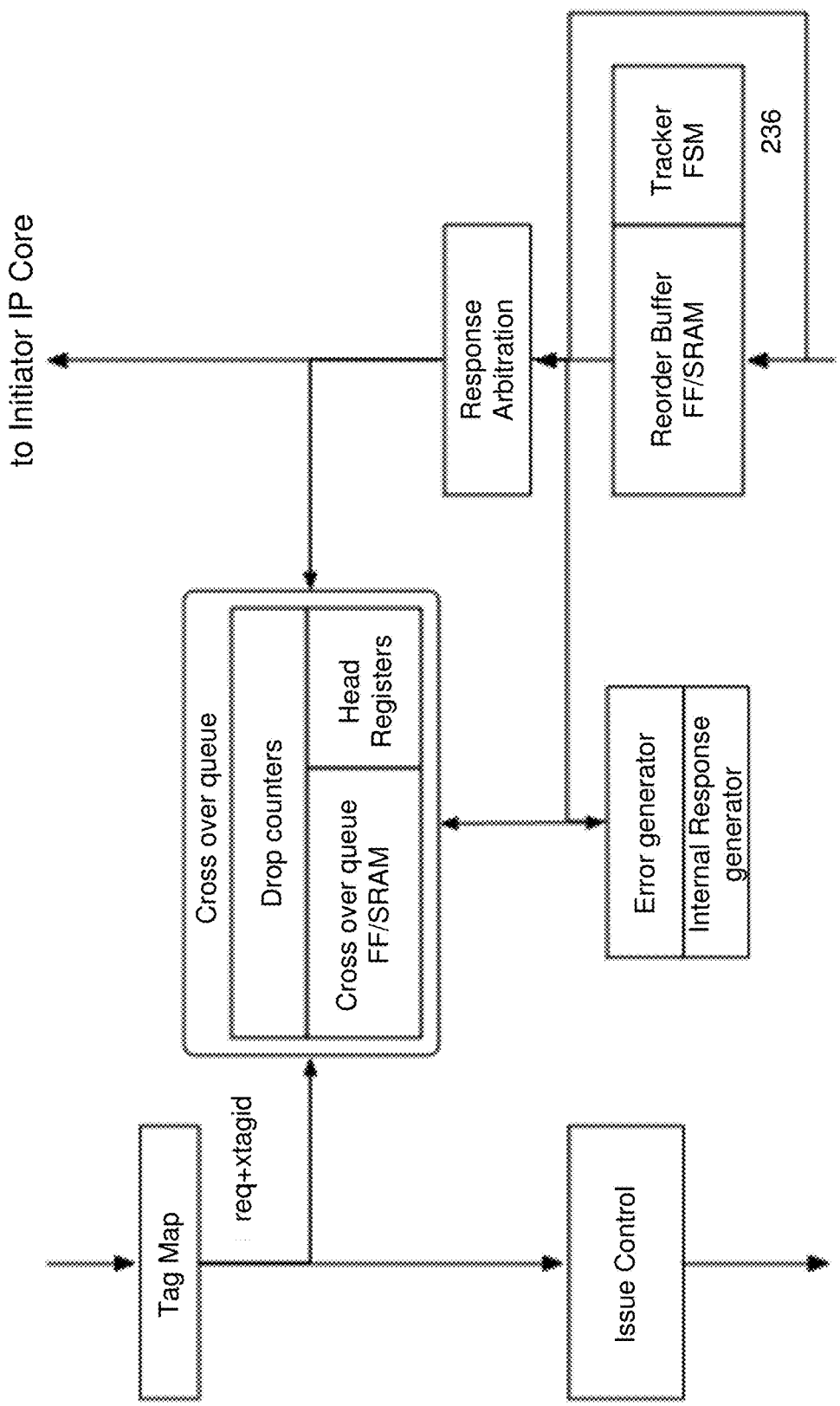
FIG. 2 illustrates a block diagram of an embodiment of the flow logic that includes one or more reservation state machines to manage a flow of transaction responses from target IP cores, potentially reordered in the multi-channel target IP core co re or two different target IP cores, such that a sequential order of the transaction responses matches an issue order of the corresponding request transactions when received back by the initiator IP core that issued the request transactions.

FIG. 2 illustrates a block diagram of an embodiment of the flow logic that includes one or more reservation state machines to manage a flow of transaction responses from target IP cores, potentially reordered in the multi-channel target IP core or two different target IP cores, such that a sequential order of the transaction responses matches an issue order of the corresponding request transactions when received back by the initiator IP core that issued the request transactions. A sequential order exists in an issued request transactions making up either i) a first thread or ii) a first set of tags with the same tag ID issued from a first initiator IP core. Note, in an embodiment, "initiator transactions or initiator bursts" can be defined as requests coming from the initiator core; and "IA (fabric) transactions or IA bursts" include both initiator requests and a set of derived initiator requests chopped to the configured channel capacity of a multi-channel target IP issued by an IA module to target agents (TAs) through the interconnect fabric.

Next, the two or more reorder storage buffers are configured to cooperate with the flow logic to send a set of transactions for that thread or set of tags carrying the same ID to be sent to multiple different target agents. The flow logic is configured to, if needed, hold out-of-order transfers of a transaction response corresponding to the thread or set of tags in the reorder buffers located in either the target agents or the initiator agent until the flow logic can send transfers ahead in a dependency order within the transaction response back to the initiator IP core in the proper issue order.

The flow logic with its tag ID and thread ID map and state machine trackers supports transactions routed to multiple memory channels in an interleaved multi-channel target as well as to multiple open targets. The flow logic with its tag map and state machine trackers in the IA supports multiple open targets for initiator transactions carrying the same tag ID by utilizing the IA reorder buffer to increase the achievable bandwidth between the IA module and its connected target agents. The flow logic in the IA supports a fine-grained multiple memory channel target feature by optionally utilizing the IA reorder buffer and/or the TA reorder buffers to increase the achievable bandwidth between the IA module and its multi-channel target agents. Thus, to increase the achievable bandwidth between the IA module and (multi-channel) target agents, a reorder buffer at the IA module can be enabled to allow multiple (channel-chopped) IA bursts carrying the same ID to be issued to different (channel) target agents concurrently without worry about responses of these IA bursts being returned out of order. Responses of IA bursts returned out of the IA module's issuing order can be stored in the reorder buffer waiting to be safely returned to the initiator core in the proper order. Due to using the IA reorder buffer, the IA module can now issue multiple (channel-chopped) IA transactions without being blocked, as long as the IA module can reserve enough entries in the reorder buffer to hold any possible out of order responses to these IA transactions.

The flow logic can be configured to generate a unique target concurrency i) thread identifier or ii) tag ID for each initiator request of the transaction. The flow logic can be configured to cooperate with the tag map that is configured to track transactions and handle deallocation. The flow logic may store a transaction response until other transactions ahead in the transaction dependency order are resolved in the reorder buffers to ensure a proper response order. Thus, the flow logic may allow a per transaction tag generation that allows a single target IP core to process response out of order for the same thread or set of tags. The flow logic allocates space in the reorder buffers for all of the responses.

Figure 3:
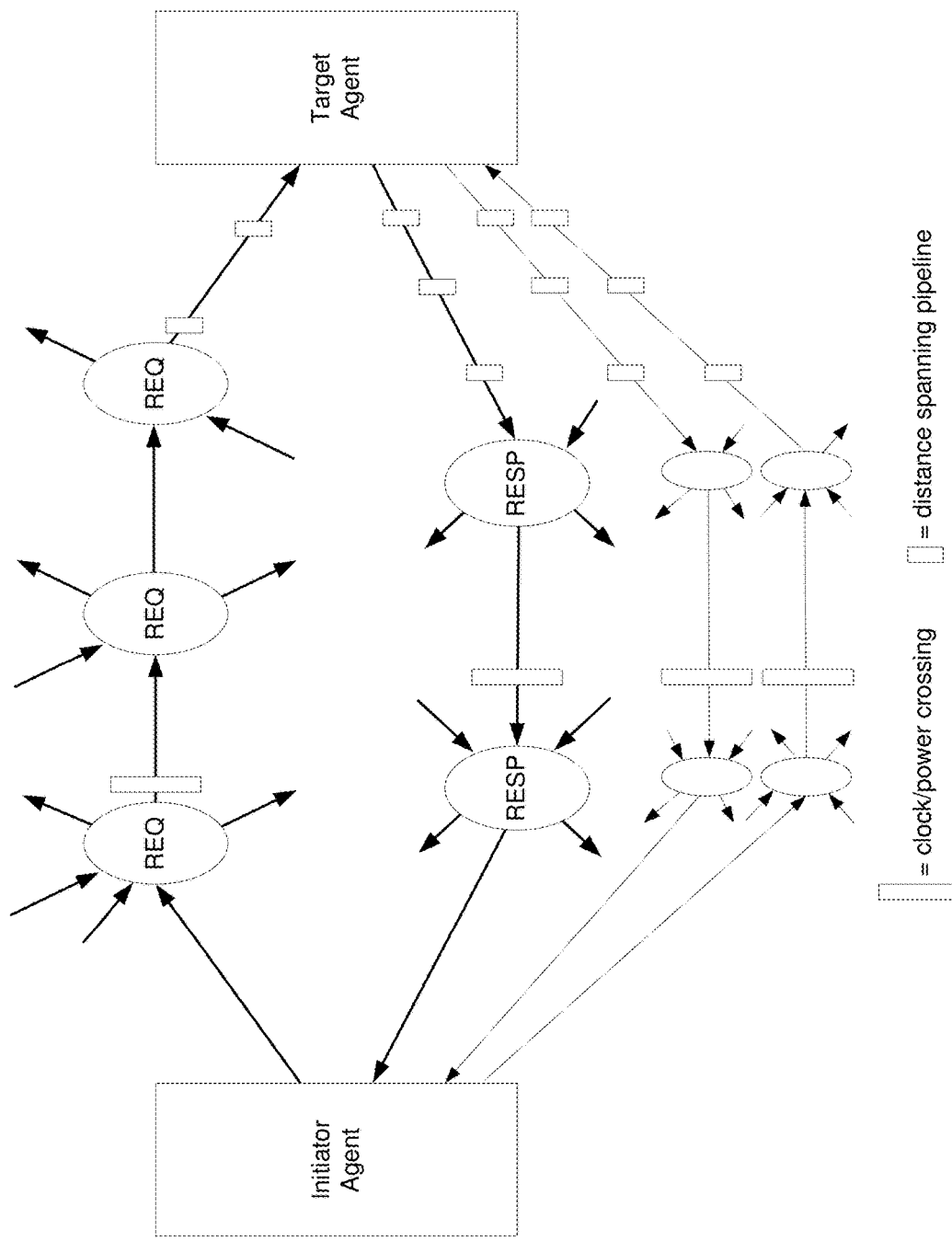
FIG. 3 illustrates a block diagram of an embodiment of the re-order control path that passes communications between the flow logic managing both reorder buffers located in an initiator agent and reorder buffers located in one or more target agents to indicate a reorder-release order for that thread or set of tags; and thus, when the target agent module is allowed to send transaction responses identified with that thread or set of tags stored in the reorder buffer in the target agent back to the initiator agent module.

FIG. 3 illustrates a block diagram of an embodiment of the reorder control path that passes communications between the flow logic managing both reorder buffers located in an initiator agent and reorder buffers located in one or more target agents to indicate a release order for that thread or set of tags; and thus, when the target agent module is allowed to send transaction responses identified with that thread or set of tags stored in the reorder buffer in the target agent back to the initiator agent module. The two or more reorder storage buffers are configured to cooperate with the flow logic, via this reorder control path. An example of the reorder network is shown next to and duplicating the paths of the response data network.

The reorder control path can be a dedicated side-band message network which is separate from the network that carries data and instructions across the interconnect. The reorder control path is constructed with one or more signal lines, alongside connections from initiator agents carrying the request transactions carrying the data and instructions of the multiple concurrent threads or set of tags to the reorder buffers, in order to deliver a reorder-release message from the flow logic to a reorder buffer located in the target agent. The flow logic delivers the reorder-release message to indicate when the target agent is allowed to send one or more transaction responses stored in the reorder buffer in the target agent back to the corresponding initiator agent. When a target agent receives a reorder-release message for a specific thread or set of tags based on the thread's or tag's ID, then the reorder buffer in the target agent can start returning transaction responses associated with i) an ID of the first initiator agent and ii) the thread's or tag's ID still potentially out of issue order, when storage capacity is available in the reorder buffer in the initiator agent. Also, a drain state allows a current transaction of the specific thread or tag to be drained out of the reorder buffer when that transaction has no other transactions of that thread or set of transactions outstanding that are ahead in the dependency chain.

Distributed Reorder Storage Buffers

The reorder buffers can be split across both the initiator and target agents. Some response reorder buffering may be located at the IA and some at the TA, which is selectable by the chip's designer. The bypassable reordering buffers are distributed in the system with storage located in both the initiator and/or target agents. The IA would have a reorder buffer to allow reordering of a limited number of responses. The TA would have a reorder buffer to allow reordering as well as avoid response back-pressure to the target. A portion of the distributed reorder buffers can be configured in each location. Thus, physically the distributed response reordering buffers are split across both initiator and target agents.

The configuration parameters for the initiator agent and the target agent allow an integrated circuit designer to configure an amount of the reorder storage capacity and size in each individual agent location, which helps reduce the overall storage requirements. An advantage of buffering in the target agents is there tends to be less of them in a System on a Chip compared to IA's, which results in less overall reorder buffer area/cost impact on the System on a Chip. An advantage of reorder buffering in the initiator agents is the improved response latency characteristics. Utilizing both of these schemes allows for any system to be tuned by the chip designer for minimal amount of reorder buffering needed for their system but with very good response throughput and latency characteristics. For example, the IA reorder buffer can be used to increase concurrency by allowing IA transactions carrying the same ID to be sent to multiple open target agents and, if needed, by holding out-of-order returning responses in the buffer until the IA module can send responses back to the initiator core in the proper order. The TA reorder buffer can provide similar capability to TA transactions; and at the same time, to avoid having the TA module apply any back-pressure in blocking responses coming back from the target core. The IA and TA reorder buffers may be able to avoid the congestion delays that would occur with reorder buffers only located in a target agent.

This distributed bypassable reorder buffer design addresses a potential Chip designer's desire for simplified application development by enabling better coexistence between classes of traffic where latency-sensitive traffic spans multiple memory channels in the target memory IP core. For example, a challenging use case is one where the frequently quiet initiators try to all access the DRAM target memory IP core while a display controller has to keep up with the screen. This is a situation where a customer can easily see application level issues with simulation software and test verification runs. This situation occurs since every time the display controller passes a channel boundary (for example 4 KB), the initiator agent blocks waiting for the outstanding transactions to one channel to complete before sending the next request to the next channel. During that time, the next channel can fill up with best effort traffic, with the result that the display controller's request is delayed by queuing as well, and then underflows. Note prior solutions have poorly tried to address a similar problem by adding reorder buffers in a single location, such as at i) an initiator agent or ii) a centrally located intermediate location between initiators and targets.

Thus, having reordering buffers that are distributed in the system with storage located in initiator and/or target agents prevents having route congestion and timing issues like those encountered by solutions which employ a centralized response reordering module. The design's distributed approach also allows for a chip's designer to optimize the needed reordering buffer area/cost vs. response throughput and latency performance.

Tracker State Machine for the Reorder Buffer

Referring to FIG. 2, the per "dependent fabric transaction" or "tracker" state machines 236 are used to track response dependent ordering. Fabric transactions that have a dependency on a prior transaction to a different target allocate a dependency tracking state machine. This state machine manages when response data is queued into reorder buffer storage and when response data can be presented to the response interface. Once the tracked dependency has been resolved, any unused reserved storage can be freed for re-use. This can allow for independent provisioning of the average number of outstanding burst-length responses and the number of reordered transactions in the reservation algorithm. The use of a dependent fabric transaction reservation model for deferred storage is advantageous because the state machine tracks fabric transaction dependencies not fabric transactions.

Reorder Control Path Next to and Duplicating the Routing Paths of the Response Data Network in the Interconnect Referring to FIG. 3, the design utilizes a reorder control path from the initiator reservation state machines to the target agents to manage the flow of reordered responses/data from targets to initiators. In an embodiment, this reorder control path may be a routed network with credit-based flow control. When using the IA reorder buffer and the TA reorder buffer in the same design, additional communications between IAs and TAs are needed to indicate when a TA module is allowed to send a response stored in its TA reorder buffer back to the corresponding IA module. A dedicated side-band message network (the "reorder-release" network) is constructed alongside connections from IAs (with reorder buffers) to TAs (with reorder buffers) in order to deliver the "reorder-release" message. When a TA module receives a "reorder-release" message coming from an IA module, where the message encodes the ID of the IA module (ia_id) and the ID of a dependency tracking state machine (tracker_id) within the IA module, the TA module can start returning reorder-buffer response(s) associated with the IA module (ia_id) and the dependency tracking ID (tracker_id).

Note that both the IA to TA and the TA to IA messages follow a topology similar to the response data network. This is selected because the response data network is presumably optimized for read traffic and the reorder network is focused on read transactions. By making the reorder network topology match that of the response data network, clock crossings, power domain crossings, and distance spanning can be placed in the same locations. This approach directly addresses the desire for some systems to avoid back-pressure on the target IP core when the IA or the network is unable to accept a response.

Figure 4:
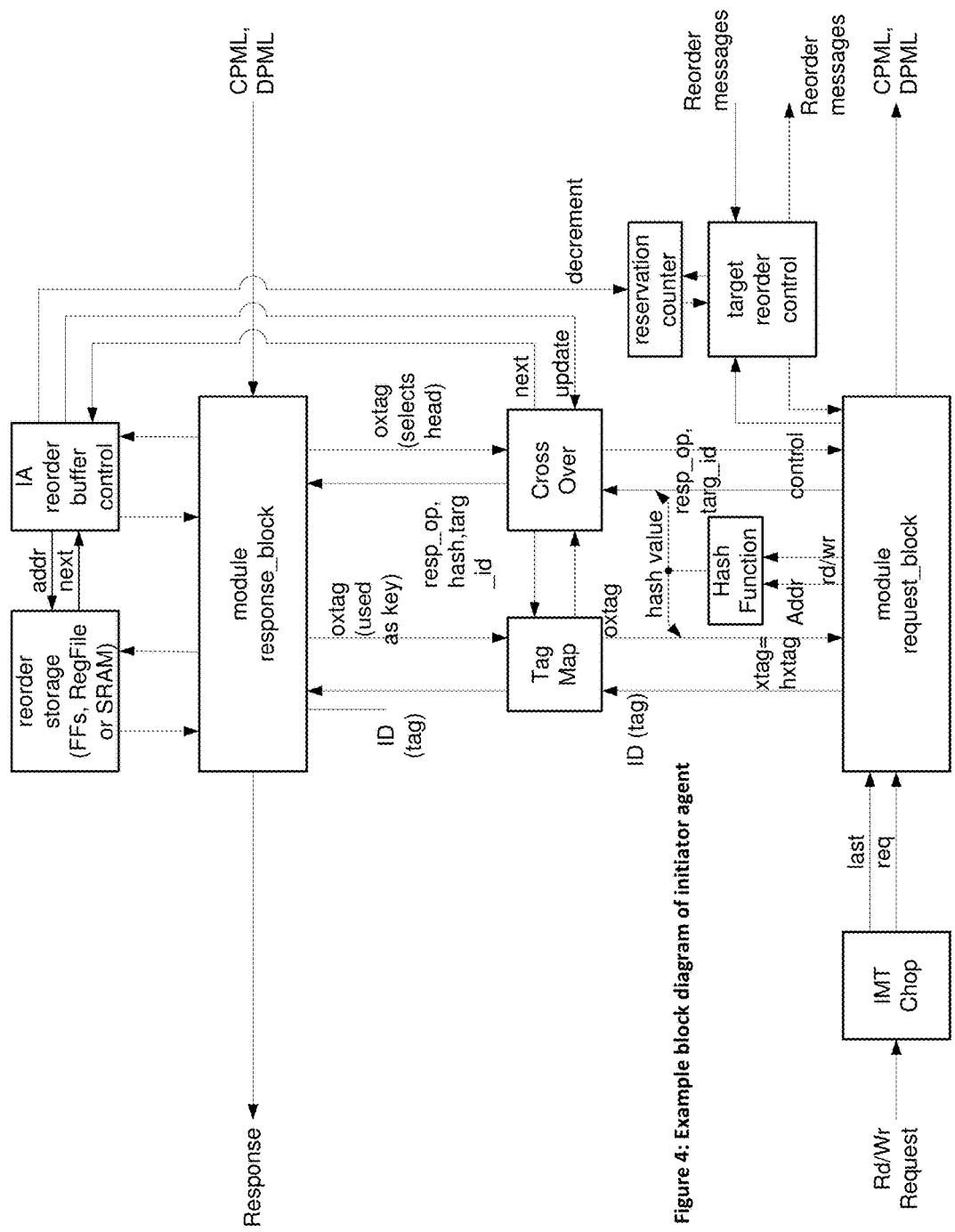
FIG. 4 illustrates an example block diagram of initiator agent with a reorder buffer and state machine, where the flow logic is configured to determine, whether or not there is enough storage space currently available in the initiator agent reorder buffer to store and fit the sequence of transactions making up the thread or set of tags, and if not then the flow logic may still conditionally release the sequence of transactions making up a thread or set of tags onto the communication fabric of the interconnect if there is enough space currently available in the reorder buffer in the target agent to store and fit the entire sequence of transactions making up the thread or set of tag IDs.

FIG. 4 illustrates an example block diagram of initiator agent with a reorder buffer and state machine, where the flow logic may determine, whether or not there is enough storage space currently available in the initiator agent reorder buffer to store and fit the sequence of transactions making up the thread or set of tags, and if not then the flow logic may still conditionally release the sequence of transactions making up a thread or set of tags onto the communication fabric of the interconnect if there is enough space currently available in the reorder buffer in the target agent to store and fit the entire sequence of transactions making up the thread or set of tag IDs. The flow logic and reorder buffers are configured to cooperate. The tracker state machine tracks transactions with possible out of order responses.

The flow logic may initially determine whether transactions making up a thread or set of tag IDs are to be routed to two separate target agents. Next, the flow logic may determine whether transactions making up a thread or set of tag IDs are re-orderable based on factors including i) rules of a protocol implemented in the System on the Chip allowing this type of thread or set of tags to be reordered, and ii) whether a particular sequence of transactions, including two sequential write request transactions and certain types of read request transactions, occurs within the thread or set of tags with the same ID. Next, the flow logic may determine whether there is storage space currently available in the initiator agent reorder buffer to store and fit the entire sequence of transactions making up the thread or set of tags, and if so, then the entire set of transactions of the thread or set of transactions associated with the tag IDs are approved for release onto the communication fabric of the interconnect. Next, the flow logic may determine, when there is not enough storage space currently available in the initiator agent reorder buffer to store and fit the sequence of transactions making up the thread or set of tags, then the flow logic may still conditionally release the sequence of transactions making up a thread or set of tags onto the communication fabric of the interconnect if there is enough space currently available in the reorder buffer in the target agent to store and fit the entire sequence of transactions making up the thread or set of tag IDs.

IA Reorder Buffer

To increase the achievable bandwidth between the IA module and (multi-channel) target agents, a reorder buffer at the IA module can be enabled to allow multiple (channel-chopped) IA bursts carrying the same ID to be issued to different (channel) target agents concurrently without worry about responses of these IA bursts being returned out of order. Responses of IA bursts returned out of the IA module's issuing order can be stored in the reorder buffer waiting to be safely returned to the initiator core in the proper order.

Some IA Issuing Rules for the Flow Logic

Due to using the IA reorder buffer, the IA module can now issue multiple (channel-chopped) IA transactions without being blocked, as long as, the flow logic via the state machine can reserve enough entries in the reorder buffer to hold any possible out of order responses of these IA transactions.

Selectable Parameters

Two parameters per initiator agent are introduced and can be used to increase the achievable bandwidth for the fine-grained multiple memory channel target feature using the IA reorder buffer. The reorder_buffer_depth parameter can be used to indicate the number of entries allocated in the reorder buffer to store out-of-order response-and-data words. The max_reorder_trans parameter can be used to indicate the maximum number of outstanding IA transactions that may have out of order responses. When the reorder buffer feature is enabled (reorder_buffer_depth>0), the max_reorder_trans value should be >=1. The reorder buffer and its size can be enabled and configured by using the per IA reorder_buffer_depth parameter.

Next, the configurable interconnect has reorder buffers at the IA side for some IAs, if not all, and has reorder buffers at the TA side for some TAs, if not all. The IA reorder buffer can be used to increase concurrency by allowing IA transactions carrying the same ID to be sent to multiple open target agents and, if needed, by holding out-of-order returning responses in the buffer until the IA module can send responses back to the initiator core in the proper order. The TA reorder buffer can provide similar capability to TA transactions and in the same time to avoid the TA module having to apply any back-pressure in blocking responses coming back from the target core.

When the chip's designer chooses to emphasize savings in area and wire congestion, using aggressive tag ID compression techniques for example, a system may have difficulty meeting design frequency goals. To optimize toward such systems, when they are required to support a large number of outstanding transactions (for instance, 256 initiator transactions outstanding or 256 different tag IDs outstanding) and/or 256 max_open_tags) at many IA modules, the implementation of the IA reorder buffer and transaction tracking can be more advantageously implemented by using an SRAM-based storage approach rather than discrete flip-flop and content addressable memory storage.

Figure 5:
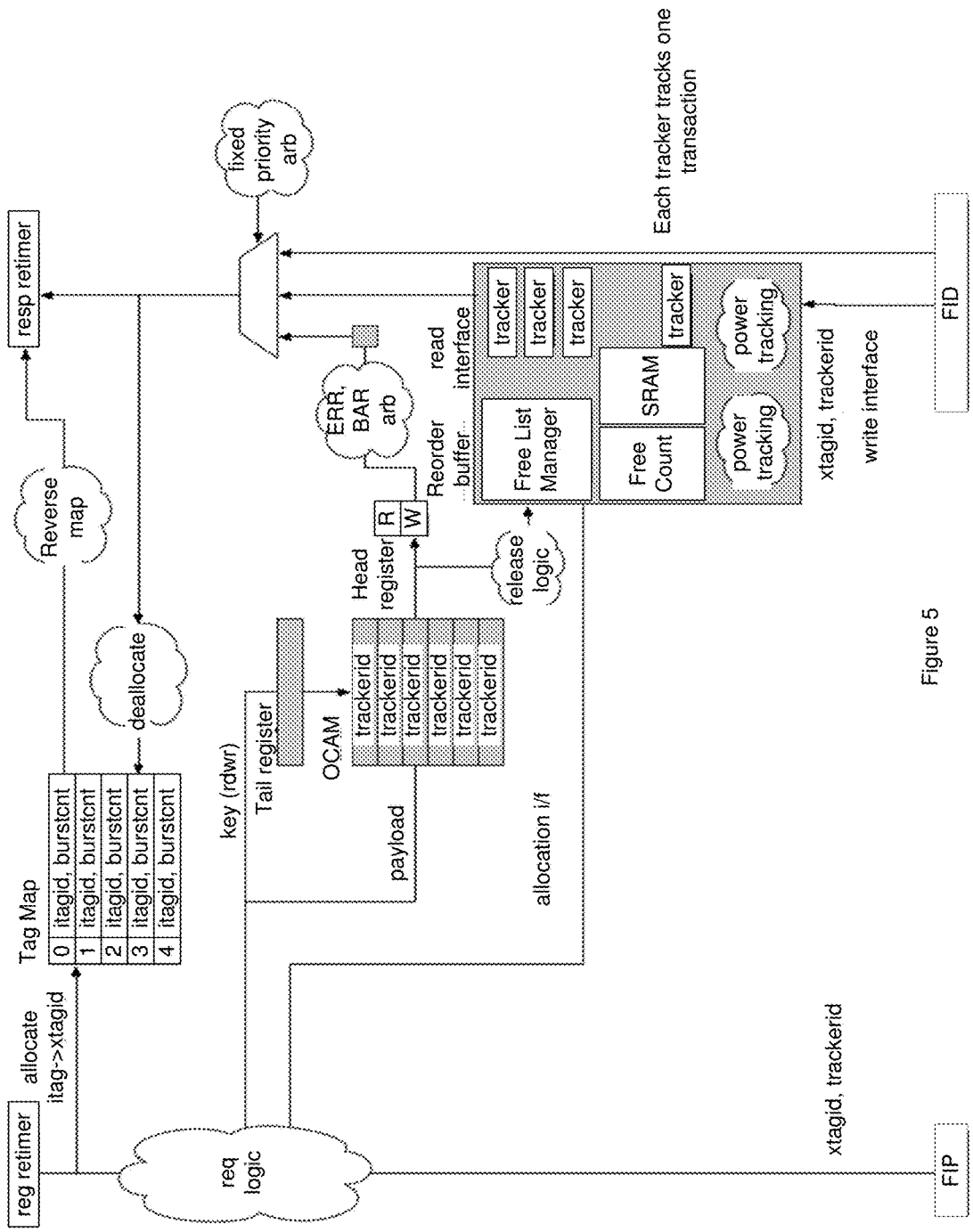
FIG. 5 illustrates an example block diagram of a flow logic configured to support mapping transaction flows within the thread or within the set of the same tag IDs i) that are sent to the multiple memory channels within the multiple channel target and/or ii) that are sent to multiple different targets to be serviced, where the flow logic includes a tag map that is configured to track transactions and handle deallocation.

FIG. 5 illustrates an example block diagram of a flow logic configured to support mapping transaction flows within the thread or within the set of the same tag IDs i) that are sent to the multiple memory channels within the multiple channel target and/or ii) that are sent to multiple different targets to be serviced. The flow logic includes a tag map that may track transactions and handle deallocation from the response reorder buffers. An ID assigned by the initiator IP core can be mapped to a new ID assigned by the flow logic.

Initiator ID, Dependency Tracker ID to Target Core Tag ID Release Mapping

The reorder-release messages are sent to include IA reorder dependency tracker IDs. The IA reorder tracker IDs need to be translated to a tag ID at the TA in order to know which TA dependency tracker to release.

TA Tag Map and Reorder Buffer ID Mapping

Each transaction received by a TA identifies a unique initiator ID and tag ID. In an embodiment, the tag ID received may have been compressed at the IA module. This unique pair of {initiator ID, tag ID} is mapped to a TA tag ID to be sent to the target core tagid. Each deferred allocate transaction has an initiator ID and IA dependency tracker ID associated with the request. At issue time, the initiator ID and dependency tracker ID are translated into an index of a release vector. The release vector index provides a direct lookup into the release vector and is associated with each dependency tracker.

Referring to FIG. 3, when using the IA reorder buffer and the TA reorder buffer in the same design, additional communication between IAs and TAs is provided for by the reorder control path to indicate when a TA module is allowed to send a response stored in its TA reorder buffer back to the corresponding IA module. Advantages in using this approach include:

Eliminating bubbles: When only using the TA reorder buffer, a delay bubble can occur, from the time when an IA module can safely receive TA responses, to the time when the TA module has been informed and any TA response has been received by the IA module. With the availability of the IA reorder buffer, the TA module can return responses ahead of time, and therefore, in the best case no bubbles are generated.

Using less overall gate area: In most systems, many IAs are initiating transactions to a few multi-channel TAs and target cores; therefore, locating much of the reorder-buffer storage in these few TA modules helps in reducing the overall storage requirements.

The reorder control path does not utilize bandwidth available in the data-flow fabric network to deliver the "reorder-release" messages communicating between IAs and TAs; and a separate control path prevents the situation where any reorder-buffer messages could be blocked behind a data-flow packet because this blocking can lead potential deadlock. The reorder control path is a dedicated side-band message network (the "reorder-release" network) and can be constructed along connections from IAs (with reorder buffers) to TAs (with reorder buffers) in order to deliver the "reorder-release" message. When a TA module receives a "reorder-release (ia_id, tracker_id)" message coming from an IA module with respect to a specific dependency tracking ID, the TA module can start returning response(s) stored in its reorder buffer that are associated with the IA module (ia_id) and the IA dependency tracking ID (tracker_id). The dedicated side-band, reorder release network is constructed from IAs and TAs using reorder buffers to deliver the "reorder-release" message. The message indicates when the TA module is allowed to send back responses associating with an IA module (e.g., ia_id) and carrying a specific tracking ID (e.g., tracker_id).

In some systems, the design allows target-side buffering that can accept responses coming from the target core, even if IA and the fabric network cannot immediately accept those responses. For instance, the design can use the TA reorder buffer to address the requirement that the TA not apply any response backpressure to the target core by allowing responses and/or data words sent by the target core to be accepted immediately.

Figure 7:
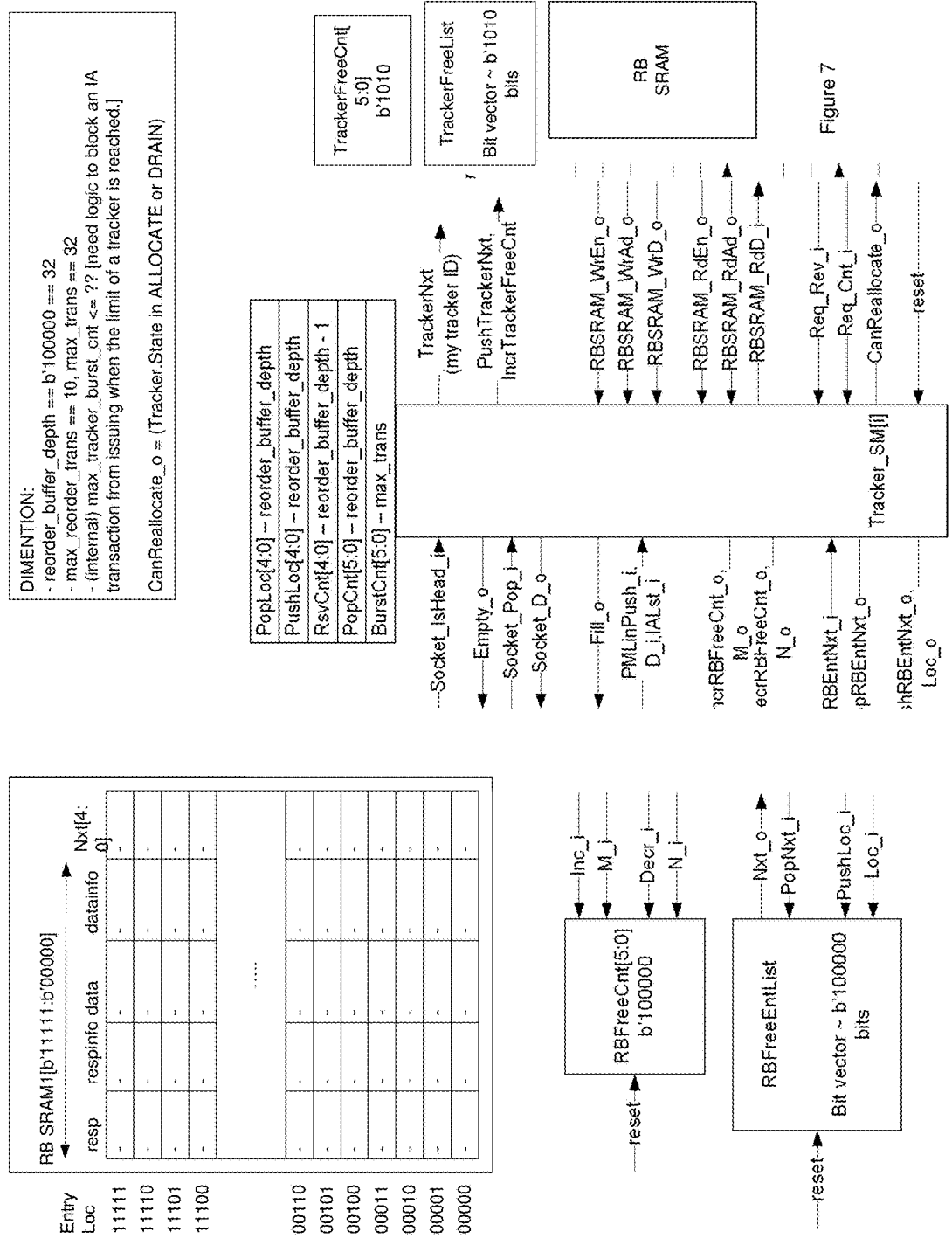
FIG. 7 illustrates an example of an initiator agent reorder buffer structure using a tracker state machine and SRAM storage.

FIG. 7 illustrates an example of an initiator agent reorder buffer structured using a tracker state machine and SRAM storage.

For systems having significantly more initiator cores than target cores, locating more of the reorder buffers in TA modules allows the design to have less overall area by requiring less storage in the IA module.

The implementation of the TA reorder buffer can also use an SRAM-based approach (rather than discrete flip-flop and content addressable memory storage) in order to achieve higher frequency for systems required to support a large number of outstanding transactions (for instance, 256 outstanding transactions or transactions from 256 different tag IDs) where the frequency requirement of these systems is more important than the area size.

In many systems, it will be desirable to allow a DRAM target to execute two read commands out-of-order provided these commands do not access the "same address," even if these commands carry the same initiator-core tag ID. It is acceptable to define this "same address" term by not using the byte address but instead by using a granularity, which is larger than 4K bytes (e.g., any single AXI transaction)—with the help at the IA or TA side to enforce that no IA transactions ever cross this 4K byte granular boundary.

The interleave boundary for each memory channel may be set to be a relatively small value (e.g. 64 bytes) to a relatively large value (e.g. 64 KB). Reorder storage buffer size embedded at an IA or TA can also be configurable by the chip's designer from a relatively small value (e.g. 64 bytes) to a relatively large value (e.g. 64 KB).

In general, transactions that cross a multiple memory channel boundary and are required to be channel-chopped to the contiguous capacity of each memory channel, cannot afford to wait for the chop addressed to the first memory channel to finish issuing responses before later chops can be delivered by the IA to TA(s) connected to the other memory channels. Note that for selected low-bandwidth initiators, such a wait penalty may be an acceptable design alternative to save area by not requiring much or any response reorder buffer storage in the IA module.

When two different transactions using the same thread ID or tag ID access two different channels in the multiple memory channel target group, it is a very undesirable performance penalty for the second transaction to be blocked while waiting for the first one to have issued all of its responses.

When two different transactions using the same thread ID or tag ID access two different targets where one or both of those targets are not in a multiple memory channel target group, it may be undesirable for the second transaction to be blocked waiting for the first one to have issued all of its responses.

In some systems, it is desirable to have reorder buffering at the TA module such that the TA can accept responses from the target core even if the IA or network cannot immediately accept those responses.

In many systems, it will be desirable to allow a DRAM target to execute two read commands out-of-order, even if those commands used the same original thread or tag ID, provided they do not access the "same address." It is acceptable for the "same address" to be defined with some granularity that is larger than any single transaction (e.g. 4 KB granularity) and to enforce that no initiator transaction ever crosses this granular boundary. That is, some number of LSBs (e.g. 12 for a 4 KB granularity) can be ignored when comparing addresses, and any transaction that crosses this boundary must be split/chopped into two transactions.

In some systems where the area penalty of a discrete flip-flop and content addressable memory (CAM) storage is undesirable, the design may have the reorder buffers (at the IA or TA module) implemented with a SRAM approach that support a read and write in 1 clock cycle. Approach: Hybrid initiator/target reorder buffers The design has some reorder buffering at the IA and some at the TA selectable by the chip's designer. The IA would have a reorder buffer to allow reordering of a limited number of responses and the TA would have a reorder buffer to allow reordering as well as avoid back-pressure to the target. The IA reorder buffer may be able to avoid the delay bubbles that would occur with TA-only reorder buffers. Locating much of the reorder storage in the TA module helps reduce the overall storage requirements. This approach directly addresses the desire for some systems to avoid back-pressure on the target core when the IA or the network is unable to accept a response. The reorder control path side-band channel is needed to communicate between the IA and TA to indicate when the TA is allowed to send a response back. The reason to use a side-band channel is to avoid stealing bandwidth from the main fabric network—especially since reorder release messages are likely to only require a few wires and would make inefficient use of wider links in the fabric conveying transaction data.

FIGS. 8A and 8B illustrate an example tracker state machine for the reorder buffer, where a tracker state machine is i) for a reorder buffer in the initiator agent or ii) for a cooperating pair of reorder buffers that geographically have portions located in both the initiator agent and the target agent. The tracker state machine may be configured to track a set of related transaction dependencies for transactions of the thread or set of tags that are capable of being reordered.

Figure 6:
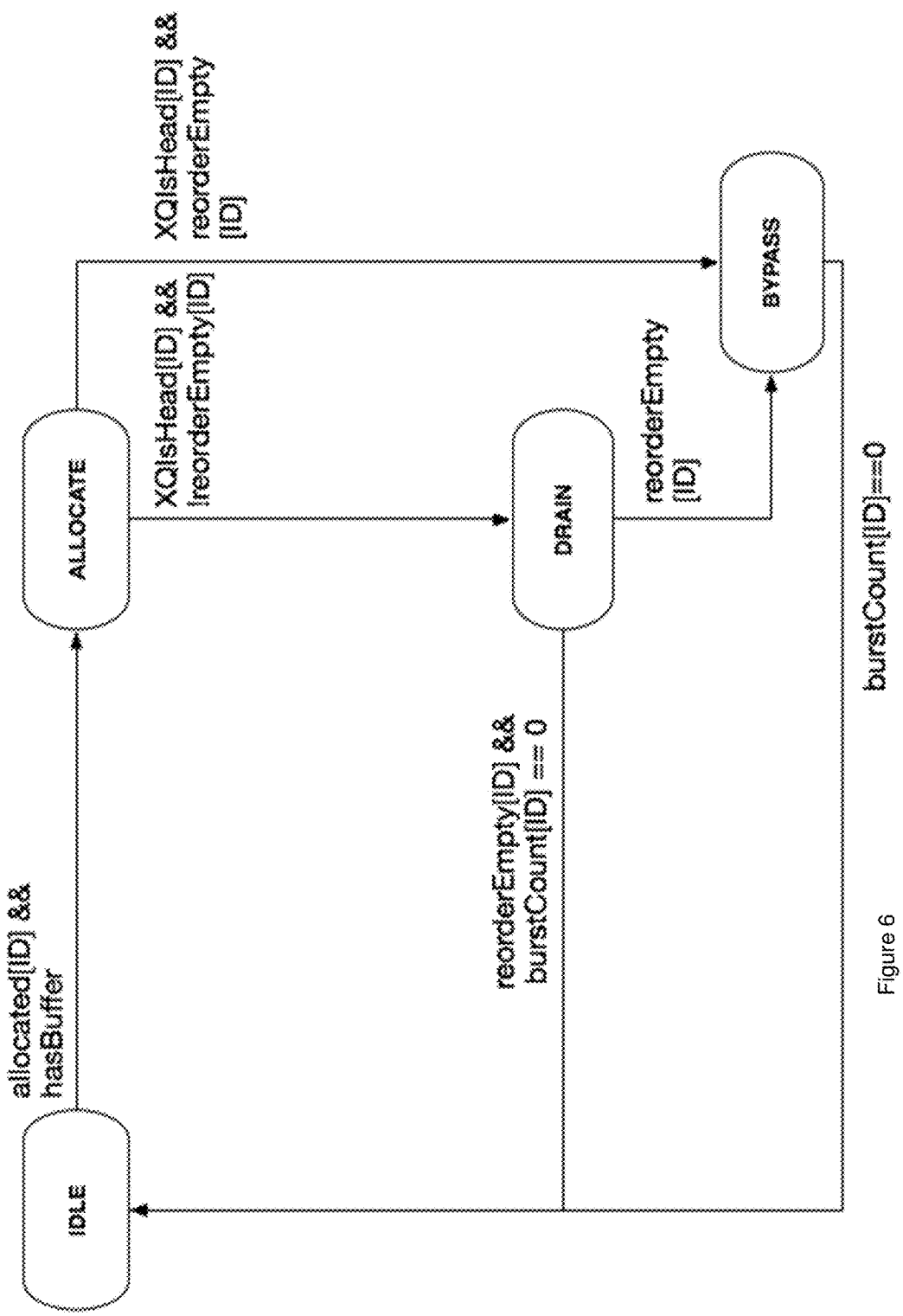
FIG. 6 illustrates an example tracker state machine where the tracker state machine has at least four mode states i) an allocate state, ii) a drain state, iii) a bypass state and iv) an idle state, where a mode state of the tracker state machine controls whether a reorder buffer is i) accumulating responses by reserving storage capacity for a given thread or set of tags in the reorder buffer in the allocate state, or ii) draining responses by releasing a stored transaction from the reorder buffer onto the interconnect for a given thread or set of tags in the drain state, or iii) causing transactions to bypass the reorder buffer and be routed directly back the issuing initiator IP core in the bypass state, or iv) the reorder buffer is idle on that cycle of operation in the idle state.

FIG. 6 illustrates an example tracker state machine where the tracker state machine has at least four mode states i) an allocate state, ii) a drain state, iii) a bypass state and iv) an idle state. A mode state of the tracker state machine controls whether a reorder buffer is i) accumulating responses by reserving storage capacity for a given thread or set of tags in the reorder buffer in the allocate state, or ii) draining responses by releasing a stored transaction from the reorder buffer onto the interconnect fabric or issuing initiator core for a given thread or set of tags in the drain state, or iii) causing transactions to bypass the reorder buffer and be routed directly back to the interconnect fabric or issuing initiator IP core in the bypass state, or iv) the reorder buffer is idle, not accumulating or draining any responses associated with a given thread or tag ID.

IA Reorder Tracker State Machine

The IA Reorder tracker state machine tracks a set of related transactions that are capable of being reordered; and thus, require the IA reorder buffer or TA reorder buffer. The tracker state machine can be logically part of the reorder buffer and only exists when there is a reorder buffer configured at the initiator agent. The IA reorder tracker state machine controls whether a buffer is accumulating responses (being reserved in the reorder buffer) or draining responses (being released from the reorder buffer) or when responses bypass the reorder buffer and are routed directly back the issuing initiator IP core.

The allocate state can be a state when a transaction has reserved storage in the reorder buffer. Response transfers are held in the reorder buffer until its transaction dependencies are released.

The deferred allocate state can be a transaction that relies on the downstream reordering control and can be allocated into the reorder buffer in the future. When the transaction dependencies have completed, the transaction then becomes bypassable. The pending deferred allocation request is invalidated.

The drain state can be when the current transaction stored in the reorder buffer no longer has other transactions outstanding that are ahead in the dependency chain and is therefore eligible for draining out of the reorder buffer and has transaction entries available to drain.

The bypass state can be when the transaction no longer has transactions and all entries in the reorder buffer are drained. No future transfers will be stored in the reorder buffer for that transaction and any reserved storage is deallocated.

TA Reorder Tracker State Machine

The allocate state can be for transactions that are allocated to the buffer. When the transaction has its dependencies released, it becomes a bypassable transaction. All the reserved storage excluding the packing requirement/single entry for rate adaptation can be released.

The drain state can be for transactions that have no reordering dependencies. The reorder tracker state machine returns to idle when it pops the last transfer for that particular ID out of the reorder buffer. When the last transfer leaves the TA reorder buffer, the rest of the reserved storage can be released.

The interleave state is for transactions that have started draining but have been forced out of the drain queue because there were no more entries available.

TA Operation—Use Reorder Buffer for Rate Adaptation:

At the TA, if the transaction is bypassable and there is sufficient space for one transfer, issue the transaction to the target core as if there is sufficient space. There should be one dependency tracker for each outstanding transaction the TA can support.

If the transaction is deferred allocate, reserve storage for the all transfers of the transaction and issue to the target core if there is sufficient space available in a reorder buffer.

If the transaction requires read interleave storage to guarantee consecutive responses to an initiator with a wider data socket, reserve enough storage for the data width ratio between the IA and the TA.

Normal transactions are drained as soon there are entries are available in the reorder buffer.

Reorder transactions are drained only when they have been signaled to be released.

TA Operation—Receiving a Release Message

A release message has the ID of the originating IA module and that IA's dependency tracker identifier. As the release message may arrive at the TA before the corresponding transaction has been issued or arrived at the same TA, the receipt of this message sets a flag to set and which will be cleared only when the buffer allocated in the TA is released or when the transaction is issued without using the reorder buffer.

TA Operation—Transaction Complete

When the transaction using the reorder buffer completes, the corresponding dependency tracker is set back to the idle state.

The target agent reorder buffer is a transfer storage that allows responses to be buffered until they can be drained by the response network. A transfer may get stored in the reorder buffer as a result of response congestion or because of reordering dependencies.

Responses are pushed to the response buffer as they arrive from the socket. Responses are read out of the reorder buffer when there are no dependencies. The response buffer may de-interleave transactions from a set of tag IDs to improve utilization/reduction of interleaves on the response path. The response buffer has small reorder state machines.

Referring to FIG. 2, the reorder buffers are bypassable. The bypassable reorder buffers' nature means that once a transaction dependency has been resolved for any outstanding transactions in that thread or set of tags, then any associated reordering storage capacity reserved for the thread or set of tags can be freed for reuse, and any remaining transactions allocated by the same dependency tracker can simply be delivered directly to the initiator IP core that issued the request transfer allowing the remaining transactions allocated by the same dependency tracker to bypass being stored in the reorder buffer of the initiator agent.

Bypassable Reorder Buffers

The bypassable reordering buffers are distributed in the system with storage located in initiator and/or target agents. Allowing "in-target" concurrency for threads and/or tags allows targets to reorder responses in a manner that is typically not allowed by standard interface protocol transaction ordering definitions. This gives more flexibility to the target in how it can interleave requests while the communication bus-interconnect maintains proper ordering of transaction responses back to the originating initiators. The bypassable nature of the distributed reordering buffers means that once a transaction dependency has been resolved, associated reordering storage can be freed for reuse and any remaining transaction responses/data can simply be delivered directly to the requester "bypassing" the reorder buffer. Thus, response and data bypassable reordering buffers allow for greater system throughput and latency improvements as more initiator requests can be issued into the on-chip interconnect and processed in parallel without worrying about ordering issues which arise when responses and data are returned from different targets or when responses are reordered within a given target.

In an example, the reorder buffer can store "responses and/or data words" (in SRAM) of "non bypassing" initiator agent Read transactions or Write transactions. A "non bypassing" initiator agent Read transaction or initiator agent Write transaction issued on the request side can be turned into a "bypassing" initiator agent transaction on the response side when responses of the previous transaction carrying the same thread ID, tag ID, or compressed tag ID, have all been returned to the socket and have no pending responses in the response buffer.

Configuration parameters with corresponding logic and storage in each agent allows for scalability.

Referring to FIG. 7, the organization of the distributed bypassable reorder buffers is such that they are designed to be scalable across a wide range of System-on-a-chip design requirements. This means that as a design requires more outstanding network transactions and more response reorder capability, the design grows in size in a reasonable manner and still maintains performance and throughput characteristics.

Referring back to FIG. 1B, transactions headed to a multiple channel target may be treated as follows.

Memory Channel Interleave Size

The channel_interleave_size attribute of the multi-channel address region can be set to a power-of-two byte size, and may allow a range from fine grained (for example 64 bytes) to coarser grained (for example 64 K bytes).

There is a restriction that the channel_interleave_size attribute of a multi-channel address region must be set to a byte size greater than or equal to the socket data word size of any IA where this IA module has a connection to any multi-channel target agents associated with the multi-channel address region.

For instance, if the socket data word size of an OCP IA module is 1024 bits, the channel_interleave_size attribute of a multi-channel address region reachable by this IA module cannot be set to 64 bytes (i.e., 512 bits).

When a transaction is directed to a multiple channel target, the initiator agent module may "channel-chop" the transaction into an equivalent set of shorter related transactions such that none may cross a channel boundary.

Certain protocols used at the socket of an initiator core may impose a maximum transaction boundary size (for example, 4 KB in the AXI protocol). When that limit is greater or equal to the channel interleave size, the design of the IA module may use the size guarantee of the protocol restriction to save area by not implementing any channel chopping logic.

For an OCP initiator core, which can access a multi-channel address region, an OCP incrementing (INCR burst) initiator transaction issued by the OCP initiator core can target at a multi-channel address region and can cross any power of 2 addressing boundary. Therefore, the OCP IA module connected to the OCP initiator core will detect any channel boundary crossing and chop INCR initiator transactions into multiple interleaved INCR IA transactions before sending these channel-chopped IA transactions to different multi-channel target agents.

For burst addressing modes guaranteeing access to an entire contiguous power-of-2 sized region known as wrapping bursts (for example AXI WRAP or OCP WRAP or XOR sequences), if the IA module receives such a burst that crosses a multiple channel boundary, the resulting set of chopped transactions may legally be changed into i) an incrementing address pattern or ii) individual transactions of the size of one IA word.

IA One-Open-Target Issuing Rule

Because the IA module, when configured without reorder buffers, enforces a single-open-target rule per tag ID, any IA transaction issued on a given tag ID and targeting a particular target agent will be blocked and serialized at the IA module when there are outstanding transaction(s) previously issued on the same tag ID to another target.

Fine-Grained Multiple Memory Channel Target Support for the Interconnect

The interconnect provides the following finer-grained multiple memory channel target support with the use of an optional reorder buffer located in the IA module in addition to the reorder buffer located in the TA module.

By enabling the IA-reorder-buffer feature, multiple multi-channel IA transactions issued on the same tag ID, but targeting different target agents can be issued by the IA module without being blocked.

The design's use of SRAM structures enables efficient area utilization while maintaining performance and timing characteristics. Logic and storage in each agent allows for scaling to even larger degrees of concurrency and number of independent memory channels. As the distributed reorder buffers solution by the chip's designer is highly scalable it may be embodied using a static memory implementation and queue based structures where traditional CAM access structures become a bottleneck.

Referring back to FIG. 4, the flow logic first determines whether transactions making up a thread or set of tag IDs is reorderable based on factors including the rules of the protocol implemented in the system on a chip. Additionally, some instructions like two sequential write request transactions or certain read operation request transactions are not reorderable within a thread or set of tags (i.e. the processing order of the transactions within the thread at a given IP address of a multiple channel target must match the sequential issue order of those transactions within a thread or set of tags). Thus, that entire thread or set of tag's and their transactions would be treated as not reorderable.

The IA tracks reorderable transactions. The issue control circuitry of the flow logic in the IA first determines whether a transaction requires reordering.

At the IA, if two "ordered transactions" are directed to different targets, reordering may occur.

Next, the flow logic determines whether there is space currently available in the initiator agent reorder buffer to store and fit the sequence of transactions making up the thread or set of tags. If so, then the whole set of transactions of the thread or set of transactions associated with the tag IDs are issued onto the communication fabric of the interconnect.

The flow logic may determine that there is not enough space currently available in the initiator agent reorder buffer to store and fit the sequence of transactions making up the thread or set of tags and the flow logic may either still conditionally release the sequence of transactions onto the communication fabric of the interconnect if there is enough space currently available in the target agent reorder buffer to store and fit the sequence of transactions or prevent the release until enough space currently comes available in either the initiator agent reorder buffer or the target agent reorder buffer to store and fit the sequence of transactions.

The flow logic can release a set of tags to the interconnect conditionally based on space being available in the target agent reorder buffer to store that set of transactions all sharing the same tag ID.

The flow logic checks against the support deferred-allocation when TA reorder storage is available.

If the IA transaction requires reordering resources, the IA will attempt to allocate a reorderable transaction to the reorder buffer if there are no existing deferred allocate transactions. If there is deferred allocate transaction support at the transaction's target, the older deferred allocate transactions are preferred to be allocated first. If there are no available dependency tracking resources to track the deferred transaction, the transaction will be prevented from issuing until the transaction has no ordering dependencies (i.e. the crossover storage structure for this ID has become empty).

If the IA does not require reordering, issue the transaction as bypassable (bypassable=0, ta_allocate=0) with a bypass transaction identification.

If reorder buffers are required and allocation succeeds, mark transaction as allocated at the IA (bypassable=0, ta_allocate=0) and include the tracker ID in the packet issued to the fabric.

If reorder buffers are required and the IA is unable to allocate a reorderable transaction to the reorder buffer and there are TA reorder buffer resources and there are dependency trackers available, allocate a dependency tracker for deferred allocation and mark the transaction as a candidate for deferred allocation. Allow the transaction to issue (bypassable=0, ta_allocate=1). Add the tracker ID to the deferred transaction allocator.

The IA module can then issue a TA allocate release message as reorder storage in the IA becomes available again:

On every cycle, attempt to allocate storage for the oldest transaction tracked by the deferred transaction allocator.

If there is sufficient storage in the IA reorder buffer, the IA sends a release message to the target agent including its own initiator ID and the ID of the dependency tracker for the transaction.

Issue TA allocate release due to dependency releases:

When the transaction reaches the head of the crossover queue, the transaction becomes bypassable and can be released. If it has been allocated at the TA, send a release message to the target agent including the initiator ID and the ID of the dependency tracker for the transaction. If there is a transaction in the deferred transaction allocator, invalidate the deferred allocation request.

Simulation and Modeling

Figure 9:
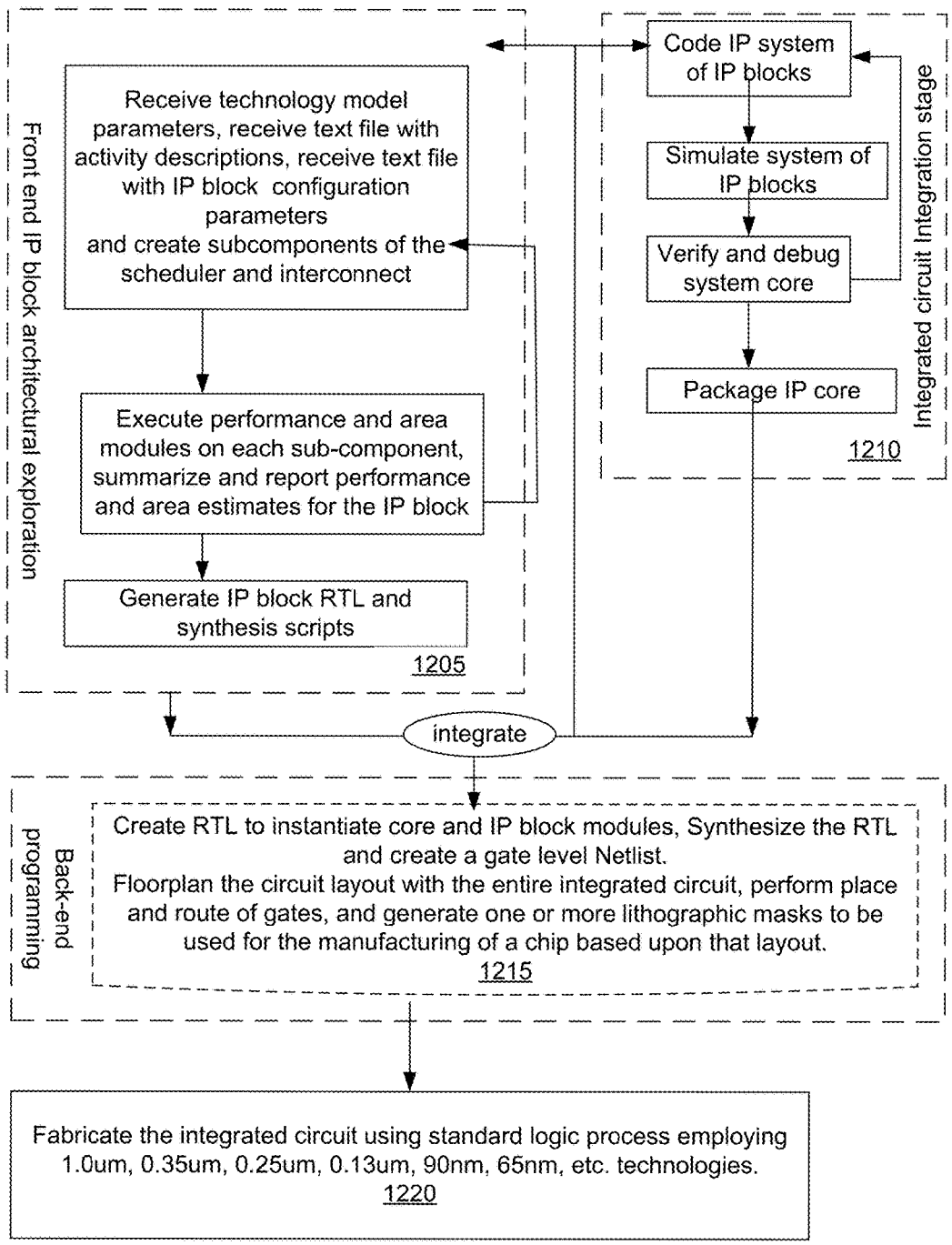
FIG. 9 illustrates a flow diagram of an embodiment of an example of a process for generating a device, such as a System on a Chip, in accordance with the systems and methods described herein.

FIG. 9 illustrates a flow diagram of an embodiment of an example of a process for generating a device, such as a System on a Chip, in accordance with the systems and methods described herein. The example process for generating a device with designs of the Interconnect may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium. The machine-readable medium may have data and instructions stored thereon, which, when executed by a machine, cause the machine to generate a representation of the physical components described above. This machine-readable medium stores an Electronic Design Automation (EDA) toolset used in a System-on-a-Chip design process, and the tools have the data and instructions to generate the representation of these components to instantiate, verify, simulate, and do other functions for this design.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP (timing, area, power) characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL (Register Transfer Level) file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 0.35 um, 0.25 um, 0.18 um, 0.13 um, 0.10 um, 90 nm, 65 nm, 45 nm, 28 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have behavioral transactor models, protocol checkers and analysis tools to display or disassemble socket activity and analyze the performance of a bundle in terms of throughput and latency, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like.

While some specific embodiments of the design have been shown the design is not to be limited to these embodiments. The design is to be understood as not limited by the specific embodiments described herein, but only by scope of the appended claims.

What is claimed is:

1. An apparatus to enable efficient transmission of transactions through an interconnect, in a System on a Chip, comprising:
   one or more initiator Intellectual Property (IP) cores coupled to the interconnect at one or more initiator ports;
   one or more target IP cores coupled to the interconnect at two or more target ports, where at least one of the target IP cores may couple to at least two of the target ports;
   flow logic configured to determine how the interconnect routes transactions between the initiator ports and the target ports; where the interconnect includes initiator agents coupled to the initiator ports to receive transaction requests from the initiator IP cores and target agents coupled to the target ports to send transaction requests to the target IP cores;
   at least one of the initiator agents includes a reorder storage buffer, where the flow logic is configured to allocate storage entries in the reorder storage buffer,
   where the flow logic is also configured to identify which transactions require storage entries in the reorder storage buffer such that (i) transaction requests with response ordering dependencies can be sent from the initiator agent to different target ports, such that the transaction requests are concurrently pending, (ii) responses to the transaction requests can be sent by the different target ports in an order that does not match response ordering dependencies required by the transaction requests received from a first initiator IP core, (iii) the reorder storage buffer stores the responses that do not match the response ordering dependencies without preventing the interconnect from delivering any target agent responses, and (iv) the flow logic identifies which transactions require storage entries in the reorder storage buffer operates so as to permit more transaction responses to be pending than can be stored in the reorder storage buffer, where the at least one of the initiator agents is a first initiator agent, where the first agent contains the flow logic, where the flow logic is configured to send transaction requests with response ordering requirements to different target ports, such that the transaction requests are concurrently pending after a first reorder storage buffer located in a first initiator agent has insufficient entries to store the associated responses; the target agents include their own target reorder storage buffer and their own flow logic configured to allocate storage entries in the reorder storage buffers, and the flow logic in a first target agent is also configured to identify which responses from the target ports can be safely, from an ordering dependency perspective, sent to the first initiator agent via the interconnect; and the interconnect includes a reorder control path to communicate flow control information from the first initiator agent to the target agents coupled to the different target ports indicating that it is safe to send a specific identified set of responses from that target port to the initiator agent.

2. The apparatus of claim 1, where the flow logic is configured to forward target port responses without going through the first reorder storage buffer located in the first target agent, when the flow control information arrives at the first target agent before the response.

3. The apparatus of claim 1, where either i) selectable parameters in a configurable programmable register, in a run time implementation or ii) design time software selectable parameters in a design time implementation are configured to support an amount, a storage capacity, and a geographic distribution of the reorder storage buffers in the initiator agents and in the target agents to be the selectable parameters by a chip's designer in order to optimize storage between the reorder storage buffers located in the initiator agents and target agents in a first instance of the System on the Chip's implementation, where a second instance of the System on the Chip is configured to have a different amount, storage capacity, and geographic distribution of the reorder storage buffers from the first instance based on the selectable parameters chosen by the chip's designer.

4. The apparatus of claim 3, where the amount of reorder buffers, the storage capacity of reorder buffers, a maximum number of outstanding transactions allowed are configured on a per-agent basis based on the selectable parameters chosen by the chip's designer; and thus, where the first initiator agent has a different amount of reorder buffers with a storage capacity for the reorder buffers and a different amount of maximum number of outstanding transactions allowed than a second initiator agent coupled to the interconnect.

5. The apparatus of claim 1, where the flow logic is configured to generate a unique target concurrency i) thread identifier or ii) tag ID for each initiator request of the transaction, and configured to cooperate with a tag map that is configured to track transactions and handle deallocation, and the flow logic is configured to store a transaction response until other transactions ahead in a transaction dependency order are resolved in the reorder buffers to ensure a proper response order.

6. The apparatus of claim 1, where the flow logic includes one or more reservation state machines to manage a flow of transaction responses potentially reordered in one of the target IP cores, such that a sequential order of the transaction responses at a first initiator port matches the issue order of the corresponding transaction requests at the first initiator port, where a reorder control path is configured to pass communications between the flow logic in the first initiator agent and the flow logic in the first target agent to indicate a reorder-release order for that thread or set of tags; and thus, when the first target agent is allowed to send a response identified with that thread or set of tags back to the corresponding initiator agent.

7. The apparatus of claim 1, where the reorder control path is a dedicated side-band message network which is separate from the network that carries data and instructions across the interconnect, where the reorder control path is constructed with one or more signal lines, in order to deliver a reorder-release message from the flow logic in the first initiator agent to the flow logic in a first target agent.

8. The apparatus of claim 1, where the reorder control path cooperates with the flow logic to deliver a reorder-release message to indicate a reorder-release order of when the first target agent is allowed to send one or more transaction responses stored in the reorder storage buffer in the first target agent back to a corresponding initiator agent, where when the first target agent receives the reorder-release message for a specific thread or set of tags based on a thread's or tag's ID, then the reorder storage buffer in the first target agent can start returning transaction responses associated with i) an ID of the first initiator agent and ii) the thread's or tag's ID still potentially out of issue order, when storage capacity is available in the reorder storage buffer in the initiator agent, and where a drain state allows a current transaction of a specific thread or tag to be drained out of the reorder storage buffer when that transaction has no other transactions of that thread or set of transactions outstanding that are ahead in a dependency chain.

9. The apparatus of claim 1, where the flow logic includes a tracker state machine i) for a second reorder buffer in the initiator agent or ii) for a cooperating pair of reorder buffers that geographically have portions located in both the first initiator agent and the first target agent, where the tracker state machine is configured to track a set of related transaction dependencies for transactions of a thread or set of tags that are capable of being reordered, where the tracker state machine has at least four mode states that control whether the reorder storage buffer is i) accumulating responses by reserving storage capacity for a given thread or set of tags in the reorder storage buffer, or ii) draining responses by releasing stored portions of a transaction from the reorder storage buffer onto the interconnect or initiator IP core for a given thread or set of tags, or iii) causing a transaction to bypass the reorder storage buffer and be routed directly back the issuing initiator IP core, or iv) available for allocation to new transactions.

10. The apparatus of claim 1, where the reorder storage buffers are bypassable reorder buffers, where the bypassable reordering buffers nature means that once a transaction dependency has been resolved for any outstanding transactions in that thread or set of tags, then any associated reordering storage capacity reserved for the thread or set of tags can be freed for reuse, and any remaining transactions allocated by a same tracker state machine can simply be delivered directly to a first initiator IP core that issued the request transfer allowing any remaining transactions allocated by the same tracker state machine to bypass being stored in the bypassable reorder buffer located in that initiator agent.

11. A non transitory machine-readable medium having data and instructions stored thereon, which, when executed by a machine, cause the machine to generate a representation of the apparatus of claim 1, wherein the machine-readable medium stores an Electronic Design Automation (EDA) toolset used in a design process of the System on the Chip that has data and instructions to generate the representation of the apparatus.

12. The apparatus of claim 1, where the one or more target IP cores includes at least a first multi-channel target IP core, where two or more memory channels that have physically different system addresses make up a first multi-channel target of the target IP cores, and the two or more memory channels populate an address space assigned to the first multi-channel target and appear as a single logical target IP core to the initiator IP cores, where at least two of the target ports couple to memory channels, where the flow logic is configured to support ordered transaction requests from a first initiator port to be concurrently pending to the at least two of the target ports that comprise the first multi-channel target, such that the first multi-channel target supports similar transaction concurrency to a single target IP core.

13. The apparatus of claim 1, where the flow logic and reorder storage buffers are configured to cooperate to support mapping transaction flows within a thread or within a set of a same tag IDs i) that are sent to multiple memory channels within a first multiple channel target and/or ii) that are sent to multiple different targets to be serviced, where the flow logic includes a map that is configured to track transactions and handle deallocation, where an ID assigned by the initiator IP core is mapped to a new ID assigned by the flow logic.

14. The apparatus of claim 1, where the flow logic is configured to determine how the interconnect routes transactions between a first initiator port and the two or more target ports by selecting a particular target port for a particular transaction request from the first initiator port using one or more of the following characteristics i) an address associated with that transaction; ii) a thread or tag ID associated with the transaction; and iii) a current number of pending transaction requests routed to different target ports capable of servicing an address associated with the transaction.

15. The apparatus of claim 3, where one or more of the reorder storage buffers that store the transaction responses for a first thread or a first set of tags with a same tag ID are geographically located in the first initiator agent coupled to the first initiator IP core and one or more of the reorder storage buffers that store transaction responses for the first thread or the first set of tags with the same tag ID are geographically located in at least the first target agent and a second target agent of a first multi-channel target agent based on the selectable parameters chosen by the chip's designer, and the flow logic is configured to monitor availability in the storage capacity in both the reorder storage buffers in the first target agent, the second target agent, and the first initiator agent to control the issuance of the request transactions from the first initiator IP core onto the interconnect as well as control issuance of the transaction responses onto the interconnect; and thus, the reorder buffers are split across both the first initiator agent for the first initiator IP core, as well as the first target agent and the second agent for the first multi-channel target IP core and a specific portion of the distributed reorder buffers that is configured in each location is set by the selectable parameters chosen by the chip's designer.

16. The apparatus of claim 3, where the reorder storage buffers are configured to cooperate with the flow logic to send a set of transactions for that thread or set of tags carrying the same ID to be sent to multiple different target agents and, the flow logic is configured to, if needed, hold out-of-order transfers of a transaction response corresponding to a first thread or set of tags in the reorder storage buffers located in either the target agents or the initiator agent until the flow logic can send transfers ahead in a dependency order within the transaction response back to the initiator IP core in a proper issue order.

17. A method to enable efficient transmission of transactions through an interconnect, in a System on a Chip, comprising:

determining how the interconnect routes transactions between initiator ports and target ports, where one or more initiator Intellectual Property (IP) cores couple to the interconnect at one or more initiator ports and one or more target IP cores couple to the interconnect at two or more target ports;

receiving transaction requests from initiator IP cores to one or more target IP cores, where at least one of the initiator agents includes a reorder storage buffer;

allocating storage entries in the reorder storage buffer;

identifying which transactions require storage entries in the reorder storage buffer such that i) transaction requests with response ordering dependencies can be sent from a first initiator agent to different target ports, such that the transaction requests are concurrently pending, ii) responses to the transaction requests can be sent by different target ports in an order that does not match response ordering dependencies required by the transaction requests received from a first initiator IP core, iii) the reorder storage buffer stores the responses that do not match ordering dependencies without preventing the interconnect from delivering any target agent responses, and iv) flow logic identifies which transactions require storage entries in the reorder storage buffer operates so as to permit more transaction responses to be pending than can be stored in the reorder storage buffer;

sending transaction requests with response ordering requirements to different target ports, such that the transaction requests are concurrently pending after a first reorder storage buffer located in the first initiator agent has insufficient entries to store the associated responses, where a first target agent, couples to multiple target ports; and identifying which target port responses can be safely, from an ordering dependency perspective, be sent to the first initiator agent and then releasing those identified responses onto the interconnect; and passing one or more commands over a reorder control path to communicate flow control information from the first initiator agent to the target agents coupled to the different target ports indicating that it is safe to send a specific identified set of responses for that target port to the first initiator agent.

18. A non transitory machine-readable medium having data and instructions stored thereon, which, when executed by a machine, cause the machine to perform the method of claim 17, wherein the machine-readable medium stores an Electronic Design Automation (EDA) toolset used in a System-on-a-Chip design process that has data and instructions to perform the method.

* * * * *

UNITED STATES PATENT AND TRADEMARK OFFICE
CERTIFICATE OF CORRECTION

PATENT NO. : 10,303,628 B2
APPLICATION NO. : 14/976620
DATED : May 28, 2019
INVENTOR(S) : Jeremy Chan et al.

It is certified that error appears in the above-identified patent and that said Letters Patent is hereby corrected as shown below:

In the Specification

Column 1, Line 7:
Replace "61/094,861," with --62/094,861,--

Signed and Sealed this
Twenty-sixth Day of May, 2020

Andrei Iancu
*Director of the United States Patent and Trademark Office*